(12) United States Patent
Sowinski

(10) Patent No.: US 10,517,232 B2
(45) Date of Patent: Dec. 31, 2019

(54) SWING ARM TRAINING SYSTEM FOR VINES

(71) Applicant: Stan Sowinski, Scott Township, PA (US)

(72) Inventor: Stan Sowinski, Scott Township, PA (US)

( * ) Notice: Subject to any disclaimer, the term of this patent is extended or adjusted under 35 U.S.C. 154(b) by 163 days.

(21) Appl. No.: 15/590,088

(22) Filed: May 9, 2017

(65) Prior Publication Data
US 2017/0325414 A1   Nov. 16, 2017

Related U.S. Application Data

(60) Provisional application No. 62/334,571, filed on May 11, 2016.

(51) Int. Cl.
*A01G 13/04* (2006.01)
*A01G 17/06* (2006.01)

(52) U.S. Cl.
CPC .................................. *A01G 17/06* (2013.01)

(58) Field of Classification Search
CPC .. A01G 17/04; A01G 17/06; A01G 2017/065; A01G 9/12; A01G 17/02; A01G 17/14
USPC ....................................................... 47/44–47
See application file for complete search history.

(56) References Cited

U.S. PATENT DOCUMENTS

| | | | | |
|---|---|---|---|---|
| 936,402 | A * | 10/1909 | Beasley | A01G 9/12 47/45 |
| 941,894 | A * | 11/1909 | Stetson | A01G 9/12 47/45 |
| 1,480,917 | A * | 1/1924 | Robinson | A01G 17/06 47/44 |
| 3,448,486 | A * | 6/1969 | Wright | E05D 11/00 16/324 |
| 3,690,033 | A * | 9/1972 | Lewis | A01G 17/06 47/46 |
| 4,578,896 | A * | 4/1986 | Brown | A01G 17/06 403/391 |
| 6,360,408 | B1 * | 3/2002 | Dykstra | F16B 45/04 24/115 G |
| 2005/0252076 | A1* | 11/2005 | Schloesser | A01G 17/06 47/46 |

(Continued)

FOREIGN PATENT DOCUMENTS

| | | | | |
|---|---|---|---|---|
| DE | 102006010033 A1 * | 9/2007 | ............. | A01G 17/06 |
| WO | WO-2015076507 A1 * | 5/2015 | ............. | A01G 17/06 |

OTHER PUBLICATIONS

Smart, Richard and Mike Robinson, Sunlight Into Wine: A Handbook for Winegrape Canopy Management, pp. 52 and 53. Fifth Edition, Mar. 1997. These pages are attached.

*Primary Examiner* — Monica L Williams
*Assistant Examiner* — Christopher D Hutchens
(74) *Attorney, Agent, or Firm* — Martin Dowling

(57) ABSTRACT

An apparatus and method for training a grape vine. The apparatus is a swing arm supporting a linear grid composed of transverse and longitudinal elements that are configured to result in a network of spaces that are sized to capture and separate the grape vine shoots. The apparatus is mobile within the vine canopy serving various functions as the growing season progresses. The mobility of the grid apparatus allows repositioning throughout the growing season while still retaining the shoots within the grid openings.

21 Claims, 25 Drawing Sheets

(56) References Cited

U.S. PATENT DOCUMENTS

| | | | |
|---|---|---|---|
| 2012/0227318 A1* | 9/2012 | Harger | A01G 9/12 47/46 |
| 2015/0272015 A1 | 10/2015 | Sowinski | |
| 2016/0316642 A1* | 11/2016 | Tegtmeier | A01G 13/0237 |
| 2018/0288951 A1* | 10/2018 | Di Battista | A01G 17/06 |

* cited by examiner

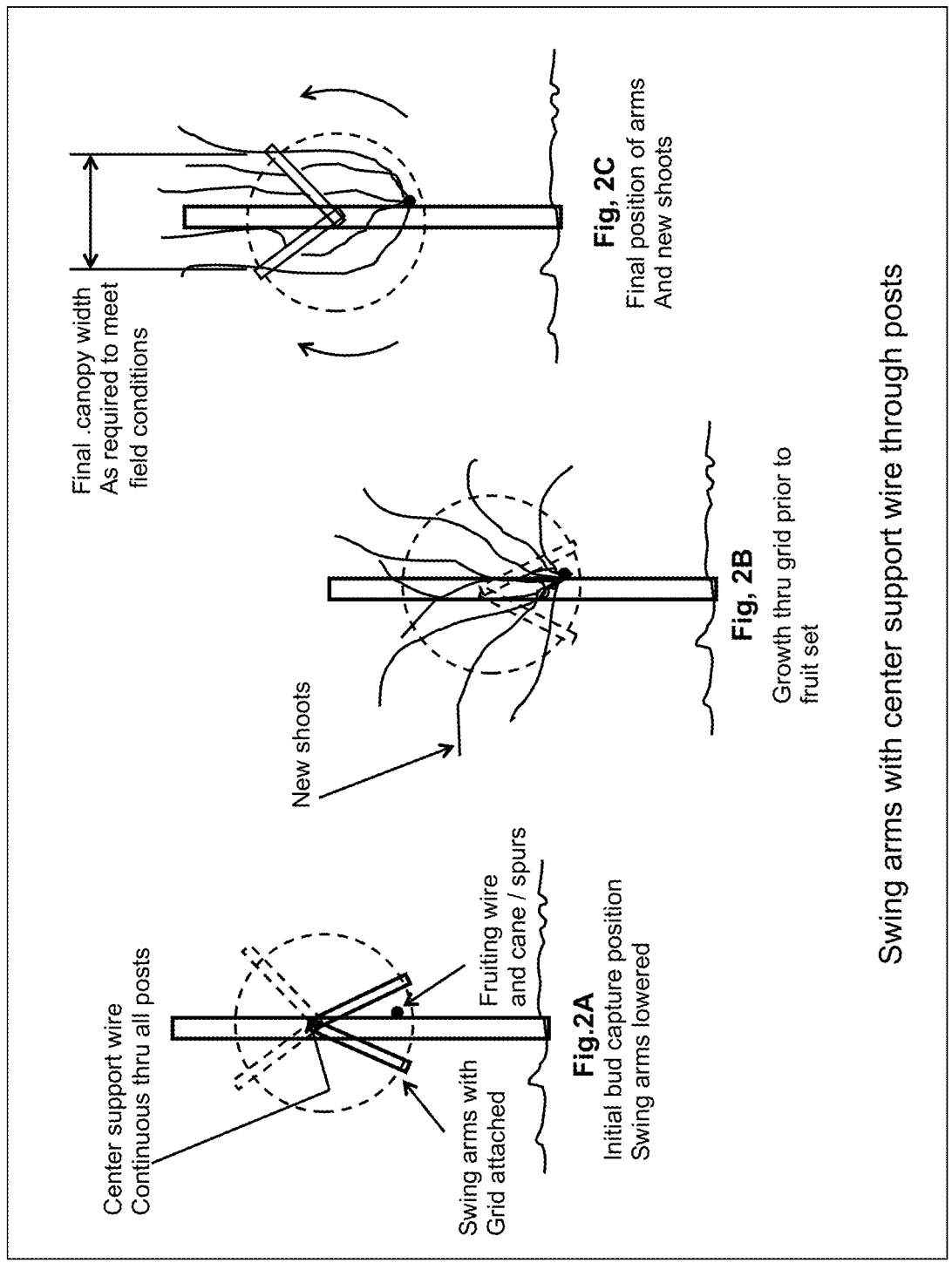

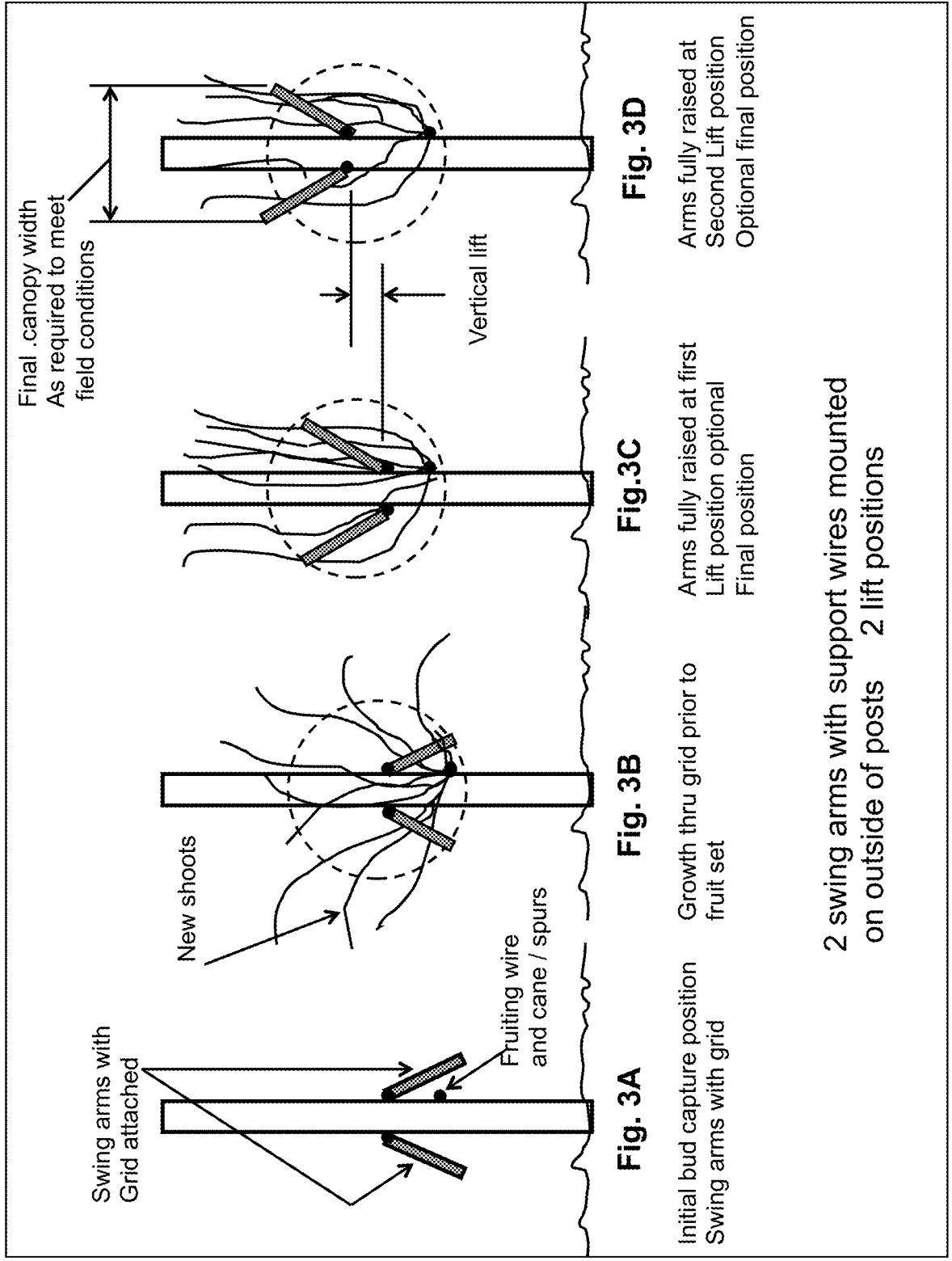

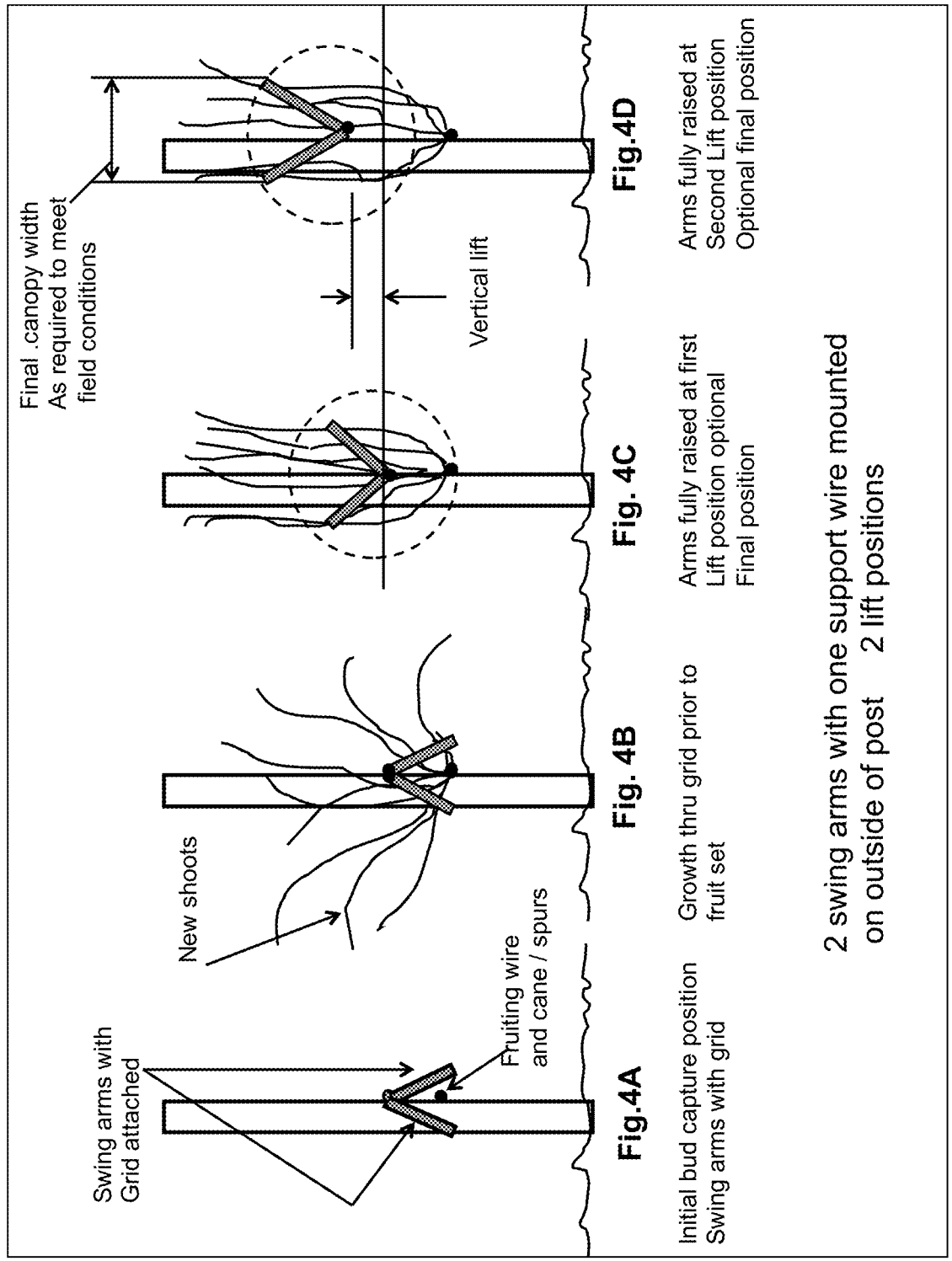

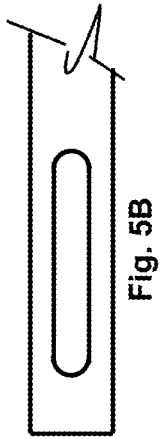
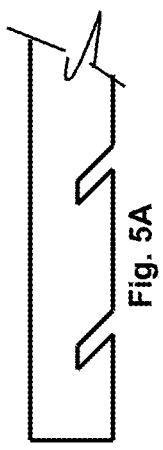
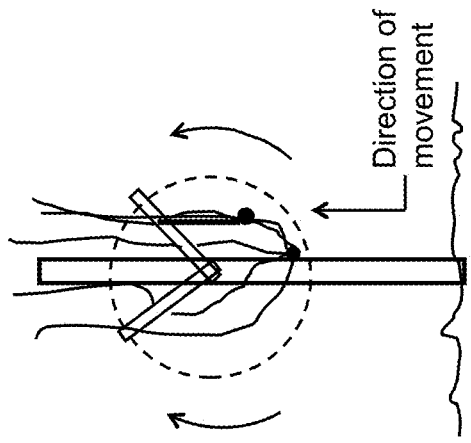
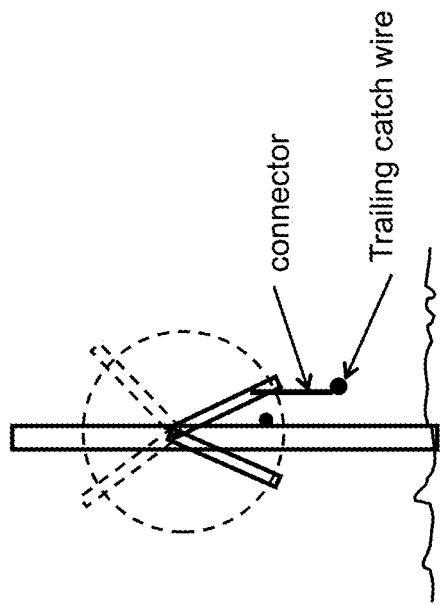
Fig. 5A Swing arm notched for variable length
Fig. 5B Swing arm slotted for variable length
Fig. 6A Initial position of trailing catch wire
Fig. 6B Final position of trailing Catch wire Swing Arm & grid, assembly

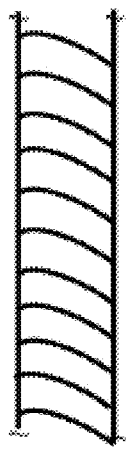
FIG. 9A
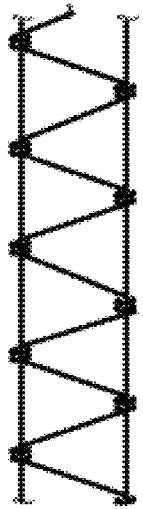
FIG. 9B
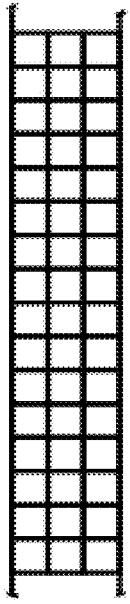
FIG. 9C
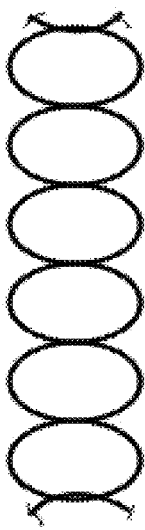
FIG. 9D
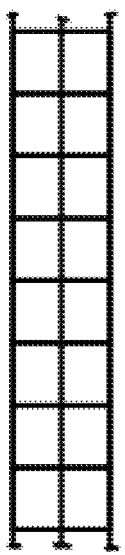
FIG. 9E
FIG. 9F

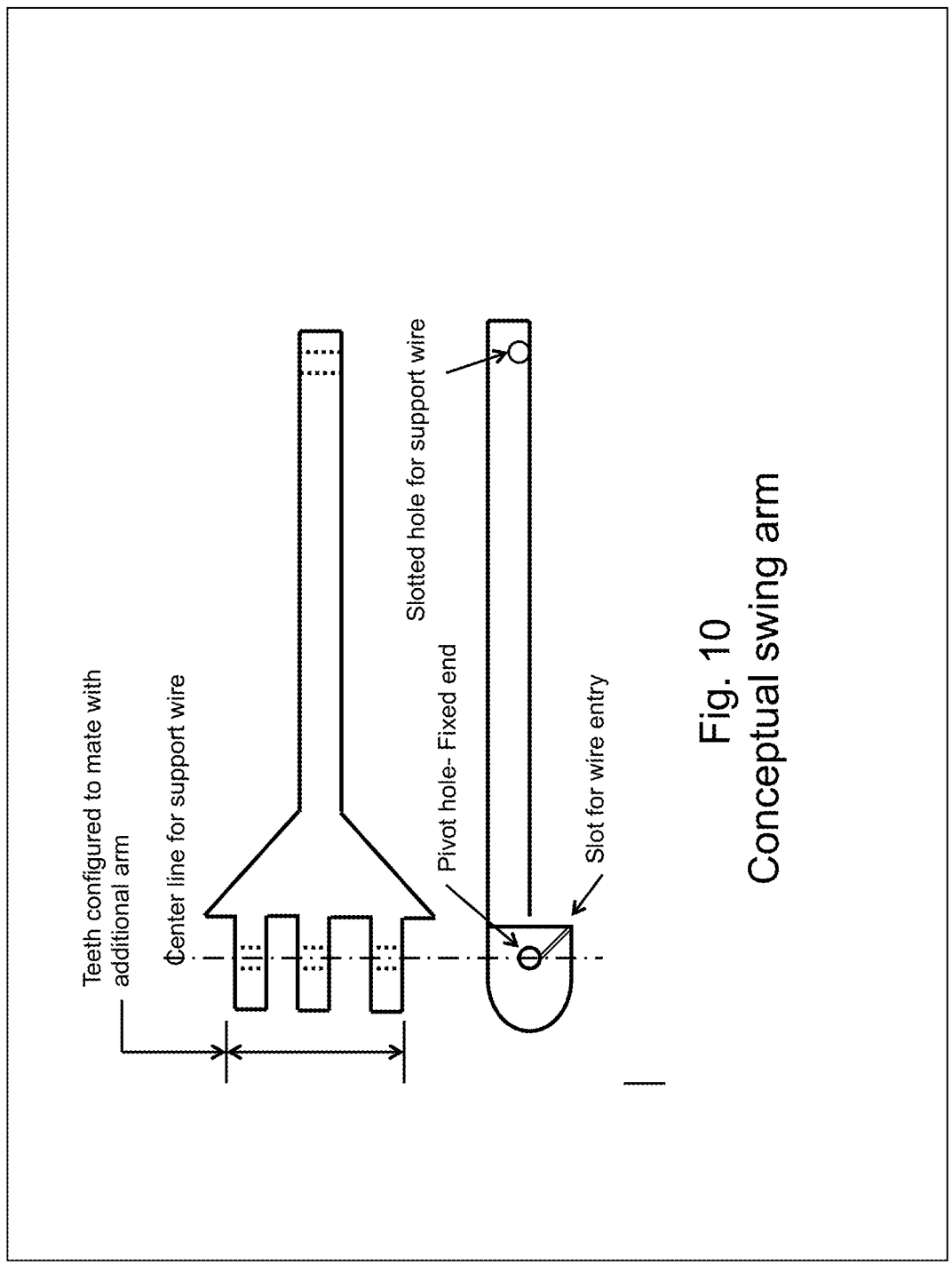

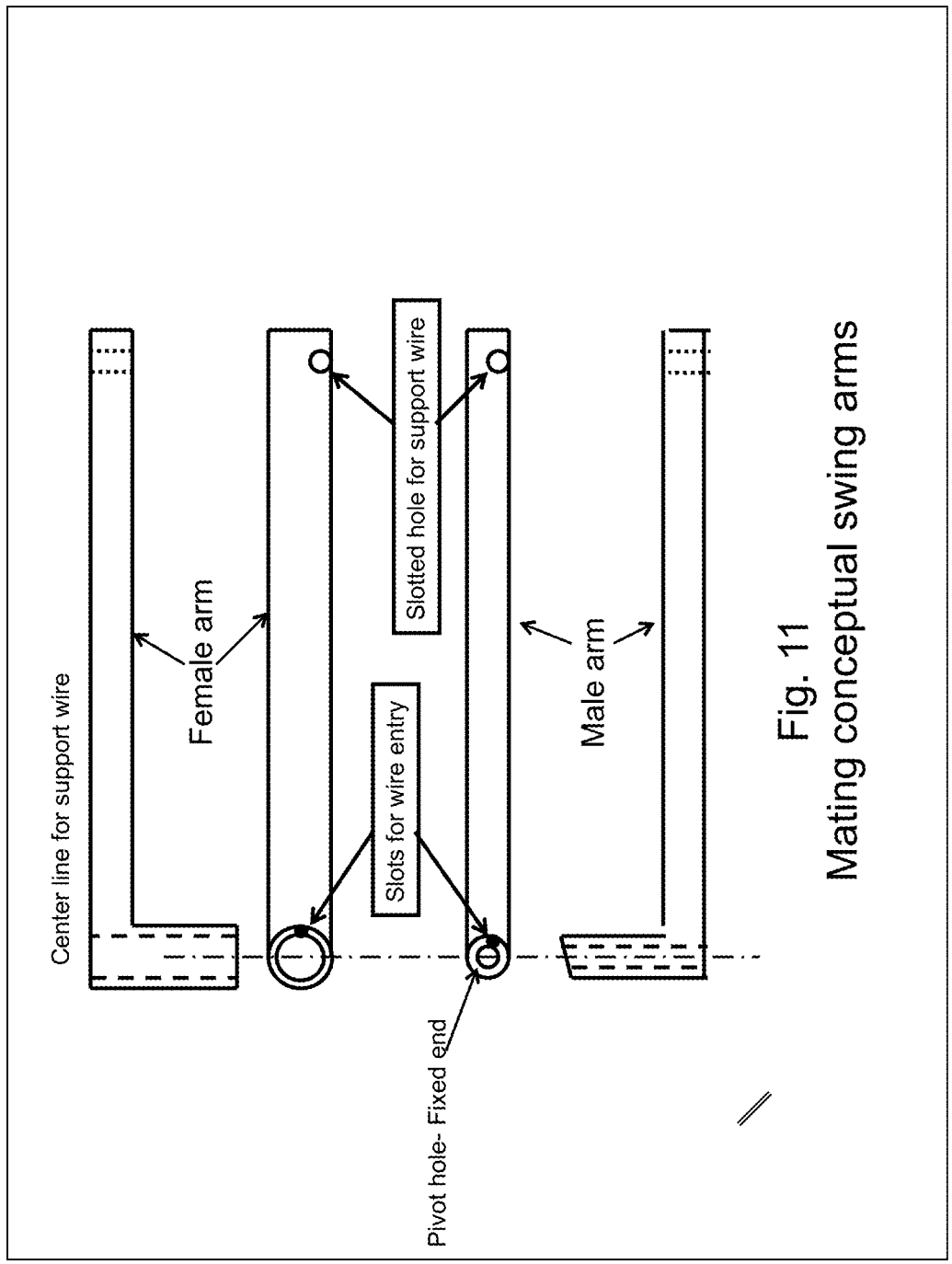

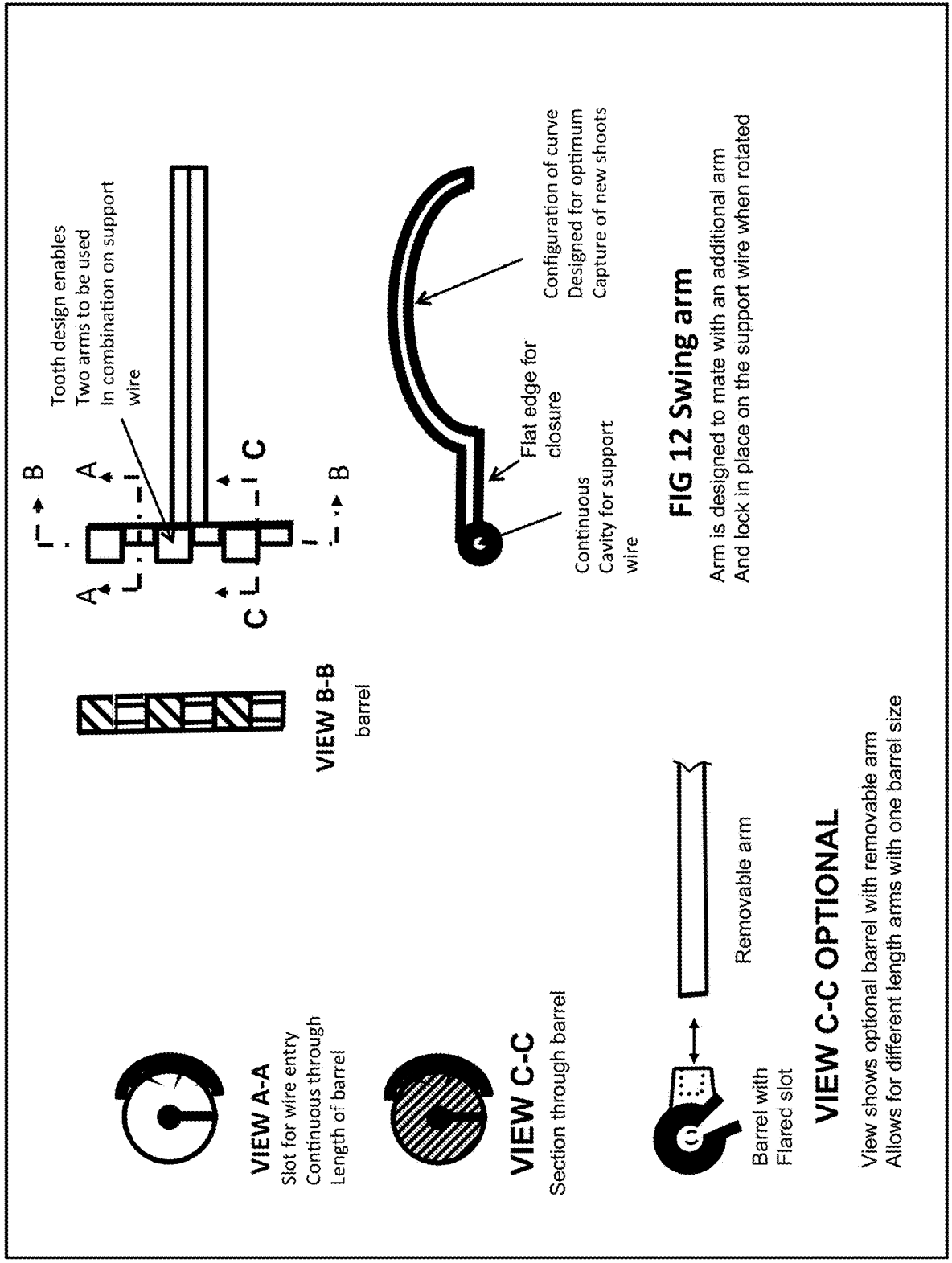

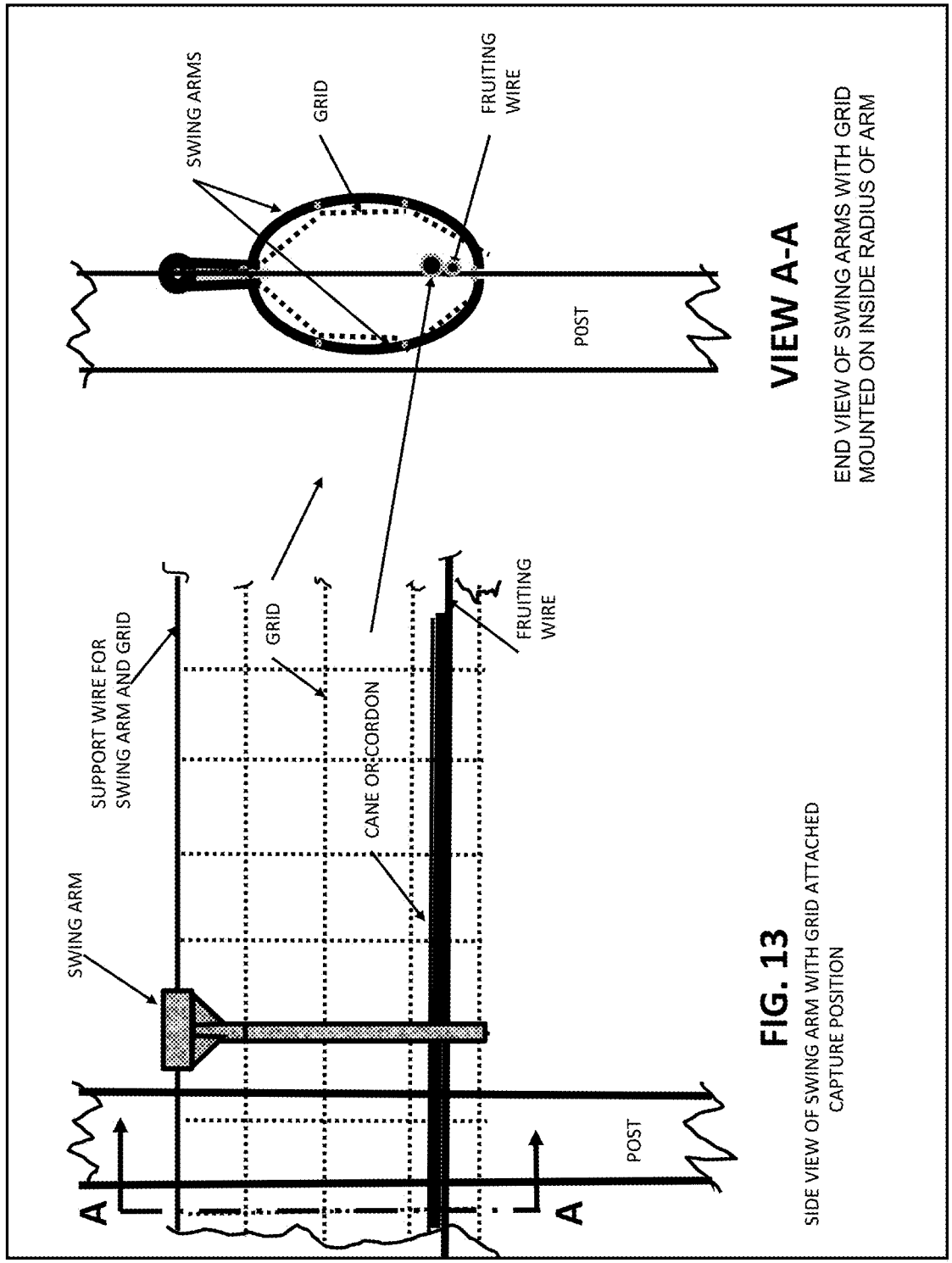

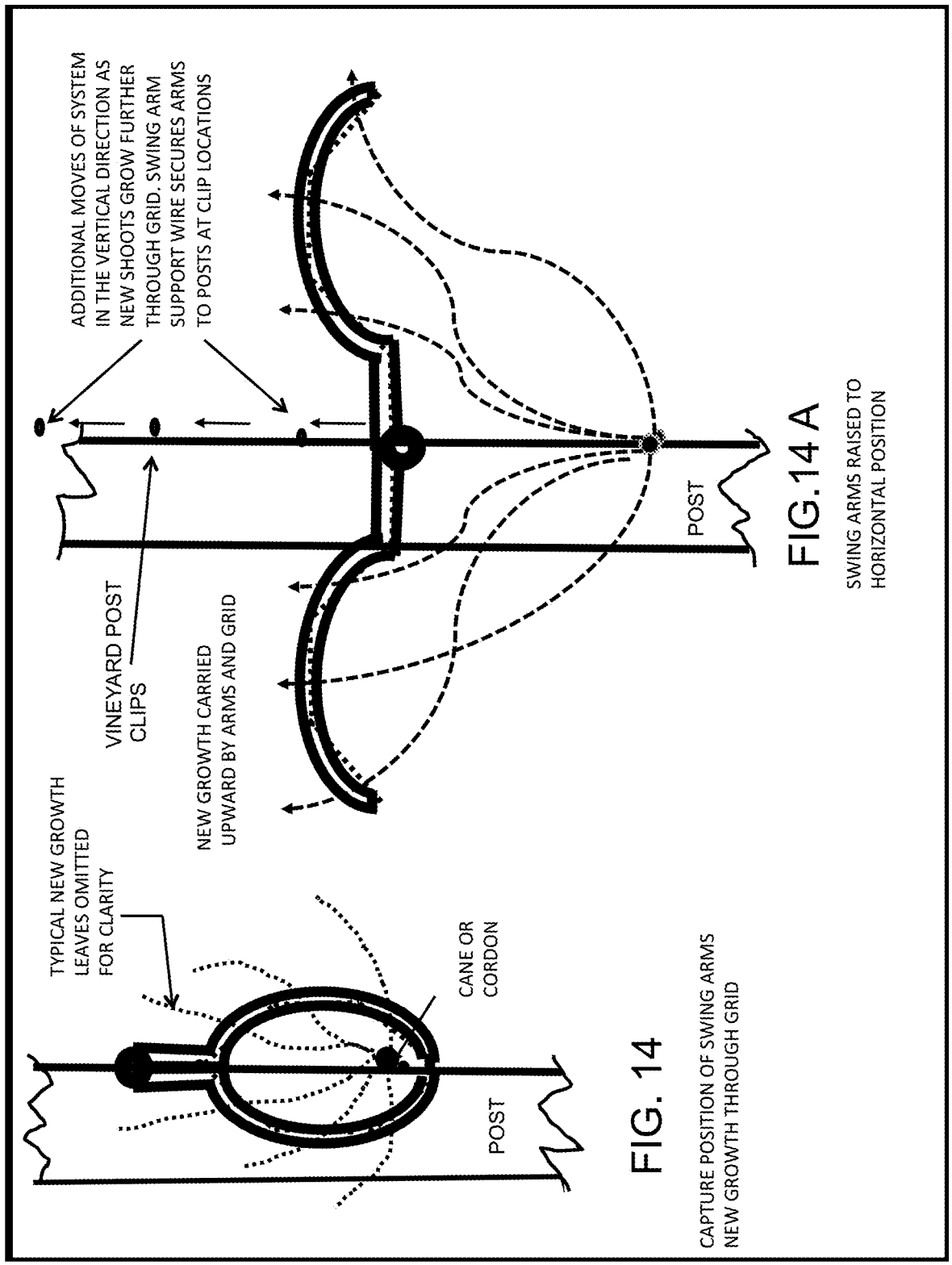

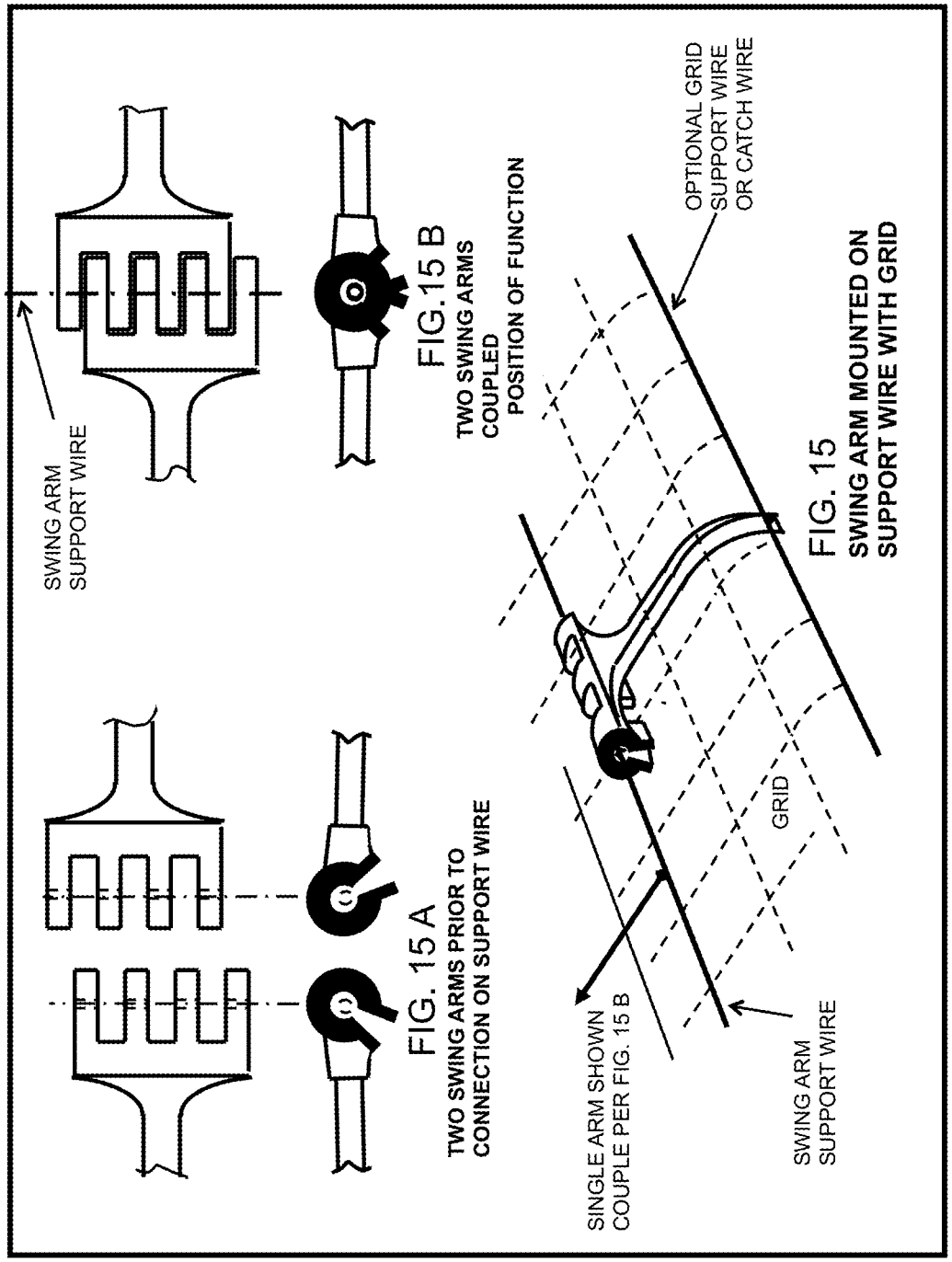

END TREATMENT FOR TYPICAL SWING ARM USE WITH GRAPEVINE TRAINING GRID

Perspective view showing how arms rotate from the capture position to partially opened Capture Position
Two arms mounted on Support wire with grid

CAPTURE POSITION OF SWING ARMS USING HOOKS

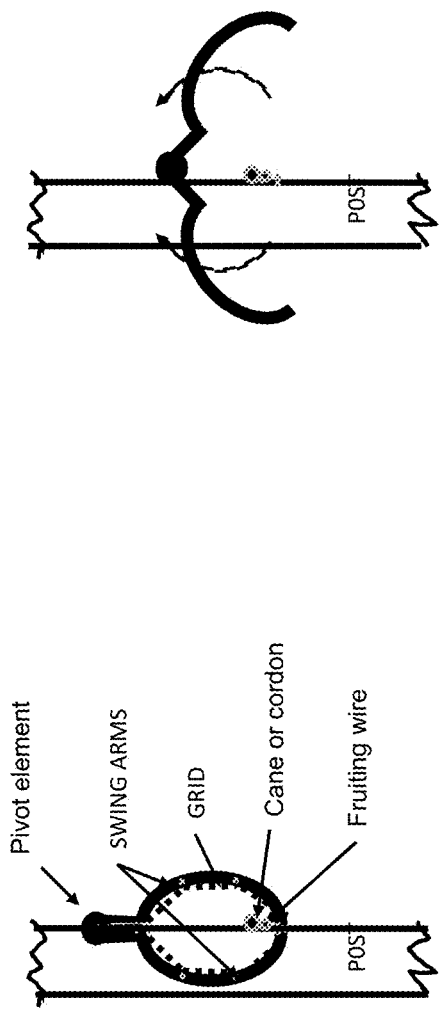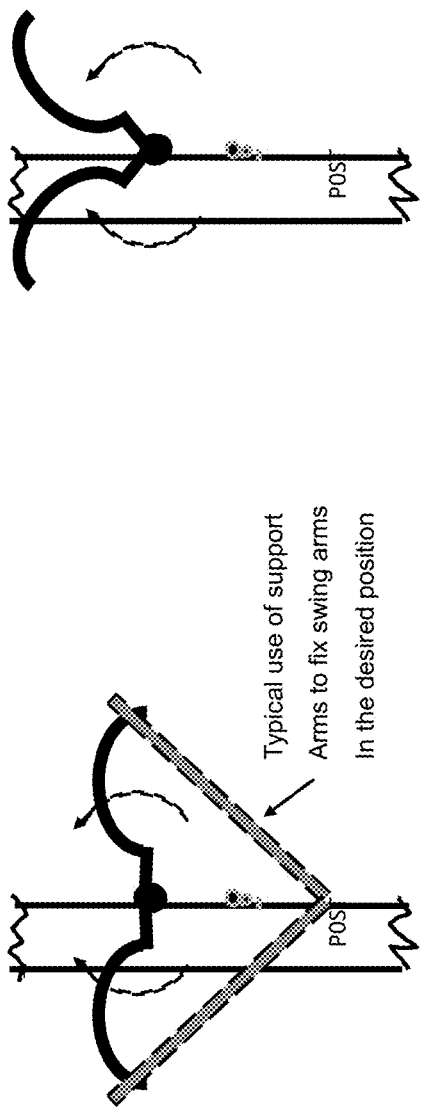

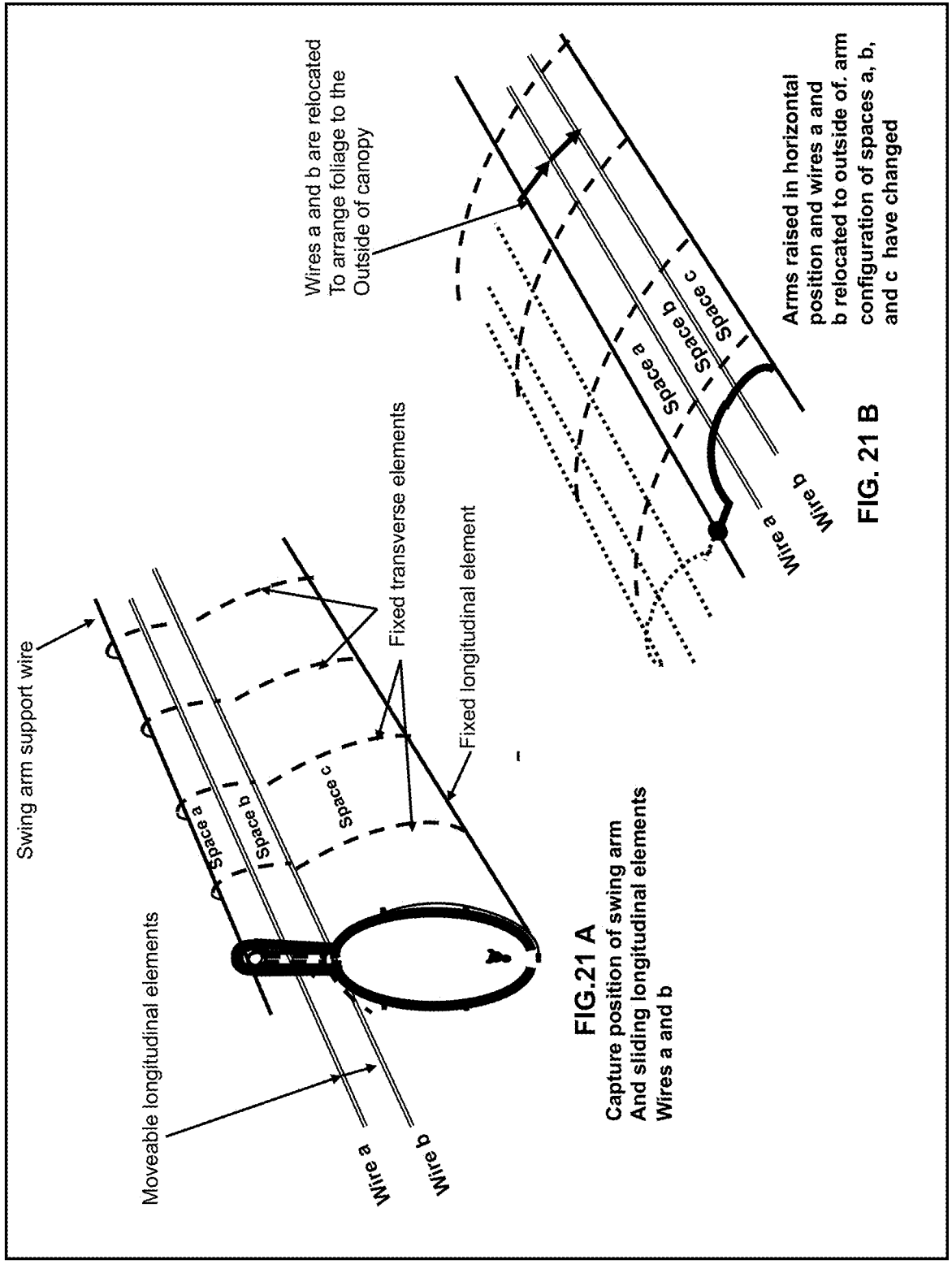

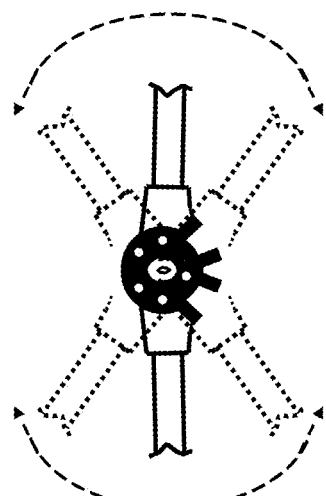
FIG. 22 A
Single arm with alignment holes
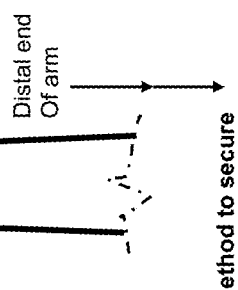
FIG. 22 B
Two arms joined using alignment holes
To lock arms in preset positions
FIG. 22
Alternate method to secure
Swing arm to pivot element

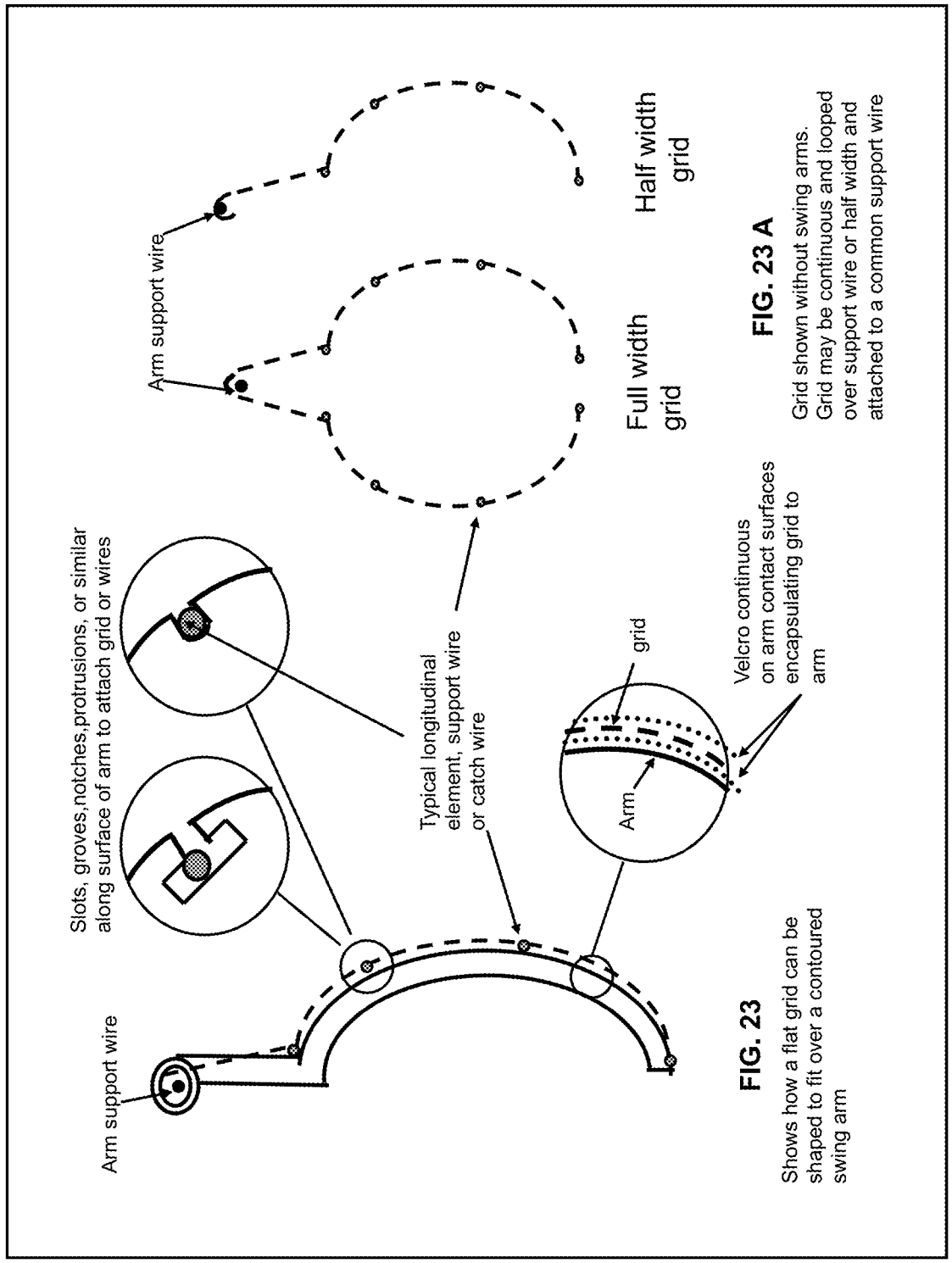

SWING ARM TRAINING SYSTEM FOR VINES

CROSS REFERENCE TO RELATED APPLICATIONS

This application claims the benefit of U.S. Provisional Application No. 62/334,571 filed May 11, 2016.

FEDERALLY SPONSORED RESEARCH

N/A

FIELD OF THE INVENTION

This invention relates to apparatus and methods for training vines, especially grape vines.

Glossary of Terms Used

Barrel—The portion of a swing arm configured to contain a pivot element. When knuckles are employed, comprises knuckles and the structure holding knuckles in position.

Bud—An undeveloped shoot. Usually consists of rudimentary leaves and flower clusters.

Cane—A mature, woody shoot after leaf fall. A source of buds.

Canopy—The above ground parts of a grapevine.

Capture Position—In this position the system is poised to "capture" newly emerging shoots from a bud on a cane, cordon or spur within the openings of the grid or between a system of wires.

Catch wire—A wire that serves to guide developing grapevine shoots. It can be movable or fixed and there may be one or a plurality of wires that act as a system.

Cordon—An extension of a grapevine trunk with a specific orientation. Cordons are perennial wood and carry fruiting spurs that are renewed annually. A source of buds.

"Cordon or cane"—the parts of the grape vine that are attached to the fruiting wire and provide shoots for training. When these terms are used together it indicates that the grower has chosen to use one or the other and that the terms are interchangeable with respect to how they interact with the novel SATS growing system.

Distal end—the end of the swing arm that is not configured to be attached to a pivot element.

First elongated element—transverse element (used interchangeably)

Fruiting wire—A wire, usually horizontal, and attached to posts. It serves to support canes and cordons within the fruiting zone.

Grid—An apparatus consisting of longitudinal and transverse elements configured to provide openings for foliage to grow through.

Grid support wire—A wire that serves to support a grid.

Knuckle—Hollow cylinder or loop configured to enclose a pivot element.

Lateral—Indicates a sideways direction with respect to a known axis. When used with respect to a grapevine canopy it indicates the side-to-side direction along the longest direction of the canopy.

Lateral support—When used in reference to a grapevine canopy it keeps the foliage from falling, slipping, or sinking in a sideways direction.

Longitudinal element—an element substantially parallel to a fruiting wire.

Pivot element—an element about which swing arms rotate.

Second elongated element—longitudinal element (used interchangeably)

Shoot—Current season's stem growth arising from a bud, including the stem, leaves and fruit.

Spur—A short cane that has been pruned to one to four nodes.

Support wire—A wire that serves to give structural support to another member, such as a grid element.

Supported wire—A wire that is directly or indirectly supported by a swing arm.

Swing arm—a pivoting element that supports a grid or supported wire for training grapevine shoots.

Swing arm support wire—A wire that serves as a pivot element and gives structural support to a swing arm.

Tendril—A slender vine growth arising from shoots. It can coil around objects and help support the shoot.

Transverse element—an element connecting a plurality of longitudinal elements.

Trellis clip—A commercially available device that attaches to the wires of a trellis system. It is used to temporarily fix a set of catch wires into a pre-determined spacing and help to prevent movement of the foliage.

SATS—Swing Arm Training System—A novel vine training method and apparatus, described below in the Detailed Description of the Invention section.

VSP—Vertical Shoot Positioned system. A conventional training technique that places the shoots of a vine into a vertical position perpendicular to the ground.

BACKGROUND

A common problem with grape vines is how to train vines to prevent overlapping foliage in order to allow sufficient sun exposure. It is well known that shading has adverse effects on fruit quality. When their leaves are shaded, grape vines suffer from higher acidity, impaired color, and lower soluble solids and phenolic content.

To illustrate the limitations of current growing methods, a conventional grape vineyard training system known as the Vertical Shoot Positioning (VSP) system will be described in this section.

In order to increase exposure to the sun's rays, vines are commonly attached to a framework called a trellis. A new growth is called a shoot and collectively, all the shoots comprise the canopy. The canopy is held in position using high tensile wire attached to posts.

FIG. 1A shows a typical Vertical Shoot Positioned canopy attached to trellis 10. Of all the variations of trellis systems the "Vertical Shoot Positioned" system is one of the most common for high quality wine grapes. The leaves of the shoots have been omitted for clarity. The vine trunks 50 are trained to terminate at the lowest wire called the fruiting wire 40. From that point, extensions of the trunk called either cordons or canes 60 are tied to the fruiting wire. New seasonal growth emerges from these cordons or canes. This growth is called a shoot 70. As these new shoots grow they follow random paths searching and competing for sunlight. In an attempt to keep the shoots from shading each other and from shading the emerging grape clusters the grower positions each shoot within catch wires 30 and enables it to grow vertically upwards. Keeping the shoots separated from each other and within their own space within the catch wires is the goal.

In FIG. 1A the vine shoots 70 have been positioned inside the catch wires 30 but can still lean along the axial direction of the fruiting wire resulting in leaf on leaf shading and crowding. The figure illustrates shoots bunching together along the catch wires and near the posts. This causes a shading problem.

There are a limited number of ways that the shoots are initially positioned within the catch wires. Positioning each shoot by hand, one at a time, is common practice. With tens of thousands of shoots per acre this is very slow and time consuming.

Another way to position the shoots is by using movable catch wires. This method is faster than hand positioning but still allows the shoots to move along the fruiting wire axial direction within the confines of the catch wires after positioning takes place. Catch wires 30 can be removed and replaced on the posts 20 through the use of post clips 80.

Although the current systems have many advantages over non-positioned vines they also have several inherent disadvantages. First, existing shoot-positioning methods are very labor intensive. After the initial positioning of the shoots one or two additional passes are usually required to keep the shoots separated and reinserted between the catch wires.

Furthermore, environmental conditions such as wind move the shoots in the fruiting wire axial direction within the catch wires resulting in a non-uniform distribution of shoots along the trellis. This results in congested areas of foliage that shade each other and lower the overall quality of the canopy. Remedial measures to correct this problem are commonly made by using trellis clips that pinch the catch wires together at one or more locations between posts. This prevents the shoots from moving sideways but contribute to additional bunching and shading of the shoots.

Another problem with conventional systems is that some shoots move within the catch wires 30 enough to escape the confines of the catch wires resulting in additional labor to reposition the foliage by hand.

On a smaller scale, there are commercial grid products designed for supporting flowers or small plants, and cannabis. The flower and small plant products are round or have length to width ratios limited to about three to one, whereas grapevine trellises are highly linear and can extend hundreds of lineal feet or as required to form an extended grapevine canopy. Garden grow thru grids are made with fixed legs or fixed height restrictions and so cannot be adjusted to the dynamic growth habits of grape vines. The plant height and growth they are designed for are much smaller than that required for vineyards. They are limited to collecting plant shoots in the upward vertical direction only whereas grape shoots start budding several feet off the ground on a fruiting wire, and can grow and also be trained in any direction, including upward, downward and diagonally. Further, they cannot be used on a trellis system such as a grape trellis or be used in a mobile fashion to spread and hold foliage apart in order to achieve more plant sunlight exposure.

Another kind of available grid-based system is used for cannabis training. A system of strings or wires are used to form a grid configuration that is randomly configured in size and is used to hold down foliage branches so as to force the plants to grow sideways. Such configuration is not mobile throughout the range of shoot growth but is made to bear downward on foliage and suppress upward growth. This system has eventual growth of buds upward through the grid openings but this is an inconvenience of the system as the buds are then necessarily cut away and separated from the grid at harvest. The grid is discarded.

Another kind is used consisting of a length of netting material established usually in a vertical plane which allows vines to grow vertically in and out of the netting on its vertical climb. This is inappropriate for vineyards using a trellis and established training system where the emphasis is on providing the leaves with maximum sunlight and air circulation.

A feature sometimes seen in downward training systems involves the use of a swing arm to change direction of growth from initially upward to finally downward. The Geneva Double Curtain (GDC) will be used as an example. Reference is made to Richard Smart and Mike Robinson's *Sunlight Into Wine: A Handbook for Winegrape Canopy Management*, pages 52 and 53, fifth edition, March 1997, published by Ministry of Agriculture and Fisheries, New Zealand. In this manual the authors show how to manipulate a winegrape canopy using what are termed "swing arms". Their method uses a wooden arm and wire to collect foliage and direct said foliage into a downward growing canopy termed the Geneva double curtain (GDC). For comparison purposes we will call this a modified GDC. While the intent of both the SMART system and the SATS system is to shoot position the foliage, the SMART system is not consistent with the novel swing arms features to accomplish the shoot positioning.

In the modified GDC, a single swing arm is attached to a fruiting wire. At the distal end (i.e., the end opposite the pivoting end) of the swing arm, a catch wire is attached that traps most of the upward growing foliage and, by rotation of the arm, swings the shoots into a downward growing direction. The GDC system is not suitable for upward-growing vines, however. For upward growing vines, such as Vertical Shoot Positioning (VSP), using only one arm would not sufficiently restrain the shoots, and using the fruiting wire as pivoting element would not retain shoots once they grew beyond the length of the swing arm.

Some of the differences between the modified GDC swing arm and the novel proposed SATS system are indicated in Table 1 below. The proposed SATS (Swing Arm Training System) is explained in the Detailed Description section below.

TABLE 1

Some Differences Between the novel SATS and modified GDC Swing Arm Systems

| Item | Novel Swing Arm Training System | Modified Geneva Double Curtain |
|---|---|---|
| Pivot axis | Pivot is above fruiting wire | Pivot is on fruiting wire |
| Training direction | Upward | Downward |
| # of arms | One arm allowed, but usual case is 2 opposing arms in contact with shoots from cordon or cane | Only 1 arm in contact with shoots from cordon or cane |
| Capturing | Captures shoots between multiple longitudinal elements on each side (for two arm case) | Captures shoots within one longitudinal element on one side only |
| Separation | Separates foliage by grid and or multiple wires | Doesn't separate foliage |
| Pivot height | Designed for adjustable pivot height | Fixed pivot height |

It is noted particularly that the SMART system is controlled by an arm attached to a fixed pivot point, namely a fruiting wire mounted on a cross bar. In contrast the SATS arms are attached directly to a support wire that has the mobility to be relocated anywhere within the vertical plane of the canopy. The SMART arms are permanently fixed in their vertical position, whereas the arms in the SATS system have various design features that allow them to be mounted on movable support wires and can be removed from the wires at any time. They subsequently can perform various functions throughout the growing cycle that are not limited by fixed arms.

These limitations demonstrate that such conventional support systems are inappropriate for training grape vines, and, as shown above, conventional grape vine training systems are not effective in preventing foliage shading. These problems are overcome by a new proposed training system described in the following sections. When the new method is applied to trellised grape vines, it is preferably referred to as the Swing Arm Training System (or SATS).

SUMMARY OF THE INVENTION

The Swing Arm Training System, or SATS, is a novel method and apparatus designed for training vegetative shoots especially grape vine shoots. It uses a fabricated apparatus to capture and train the shoots whereby the vine parts can attract maximum sunlight and require less labor to train and maintain the position of the vines. The SATS system can be useful employing a single arm, but is most powerful using a pair of opposing, rotative swing arms that support a grid and or system of wires that capture and train vegetative shoots.

One embodiment of the invention for training vegetative shoots comprises a post, a fruiting wire supported by the post, a cordon or cane attached to the fruiting wire, the cordon or cane generating the shoots during the growing season, a pivot element located above the fruiting wire, a pair of opposing, rotating arms that rotate about and are supported by the pivot element, the arms substantially surrounding the fruiting wire and capturing growing shoots, insofar as possible given the specific swing arm design used, when the distal ends of said arms are rotated into proximity to each other, and having at least one grid attached to the arms.

In an embodiment, there may be a separate swing arm support wire for each swing arm.

By this apparatus, the arms can be positioned close together early in the growing season to enable the grid or grids to capture the shoots, and then the arms can be rotated farther apart later in the growing season to enable the grid or grids to spread out and train the shoots as they pass through the grid or grids and continue to grow.

The pivot element previously mentioned can be rigid such as a nail, screw, pin, or shaft, or it can be flexible, such as a cable, rope, fiber, or support wire. Many examples will be given in the text and figures using a swing arm support wire, but any pivot element can be used.

The embodiment described above may also have a plurality of fasteners on the post, allowing the height of the pivot element to be adjusted thus enabling the swing arm and its attached grid or grids or supported wires to change vertical position to keep up with shoot growth.

The embodiment above may also have supported wires attached to the swing arms, the wires serving as longitudinal elements of the grid or grids, whereby the spacing of the wires may be adjusted over time to provide a more equitable distribution of shoots among the grid spaces.

The apparatus may have its swing arms configured to intercalate and interlock while attaching to the pivot element.

In another embodiment we retain the post, fruiting wire, cordon or cane, pivot element and pair of opposing, rotating swing arms as described above, but instead of capturing the shoots in a grid only, they are captured in addition between a plurality of supported wires attached to each arm, the plurality of supported wires on each arm running parallel to said fruiting wire. It follows from the foregoing that the distal ends of said arms can be rotated into proximity to each other at the beginning of growing season, then later rotated apart, thereby raising all the wires attached to each arm and thus containing said shoots within the boundaries of the wires. The position of the supported wires on the swing arms can be spaced to capture shoots between the wires in an equitable manner, and to retain and train them as the arms are rotated apart and raised through the growing season, and the relative position of the wires can be changed as the arms are rotated during the growing season to provide optimum sun exposure for each angle of rotation used In an embodiment, a method of training vegetative shoots arising from a cordon or cane includes attaching one or more grids to opposing swing arms that are able to rotate about a pivot element; supporting the pivot element by a post; positioning distal ends of the swing arms close together early in the growing season whereby the attached grid substantially surrounds the cordon or cane; capturing the shoots by the grid or grids as the shoots emerge from the cordon or cane and pass through the grid or grids; and rotating the distal ends of the swing arms farther apart later in the season in order to allow the grid or grids to spread out and train the shoots as they continue to grow. The arms can also be rotated closer together to allow more space between rows if the need arises.

The pivot element described in this method can be rigid such as a nail, screw, pin, or shaft, or it can be flexible, such as a cable, rope, fiber, or support wire.

The method may further include repositioning the pivot element on the post later in the growing season whereby the height of pivot element can be adjusted thus enabling the swing arm and attached grid or grids or supported wires to change vertical position to keep up with shoot growth.

The method may further comprise attaching supported wires to the swing arms, these wires serving as longitudinal elements of the grid or grids, then adjusting the spacing between longitudinal elements of the grid or grids by changing the location of the wires along the swing arm, thus enabling a more equitable distribution of shoots in grid spaces. The relative position of the wires can be changed as the arms are rotated during the growing season to provide optimum sun exposure for each angle of rotation used.

The method may also include having the swing arms intercalate and interlock by means of a common slot and common cavity able to receive the pivot element.

Another method of training vegetative shoots arising from a cordon or cane comprises attaching a plurality of wires to each of opposing swing arms that are able to rotate about a pivot element; supporting the pivot element by a post; positioning the distal ends of the swing arms close together early in the growing season; and rotating the distal ends of the swing arms farther apart later in the season, whereby the attached wires spread out, contain and train the shoots as they continue to grow. The arms can also be rotated closer together to allow more space between rows if the need arises.

The improvements and the method of using this new concept are explained in the "DETAILED DESCRIPTION" section.

BRIEF DESCRIPTION OF THE DRAWINGS

FIG. 2A is an end view showing two straight swing arms mounted on the centerline of a trellis post. The swing arms have grids attached and are shown in initial bud capture position with swing arms lowered.

FIG. 2B is an end view showing new shoots growing through grids on the swing arms while the swing arms are in the lowered (capturing) position.

FIG. 2C is an end view showing shoots being trained in the vertical direction by the swing arms now rotated to a raised position.

FIG. 3A is an end view showing two swing arms mounted on support wires attached on both sides of a trellis post. The swing arms have grids attached.

FIG. 3B is an end view showing new shoots growing through swing arm grids mounted on support wires attached to both sides of a trellis post. The swing arms are in capture position.

FIG. 3C is an end view showing shoots being trained in the vertical direction by the swing arms now rotated to a first rotatively raised position.

FIG. 3D is an end view showing swing arms raised in a vertical direction at a second lift position, this time by vertical translation rather than rotation.

FIG. 4A is an end view showing swing arms with grid attached, the arms in initial bud capture position. The swing arms are hinged on the same side of trellis post.

FIG. 4B is an end view showing new shoots growing through swing arms grids, the swing arms in shoot capture position.

FIG. 4C is an end view showing shoots being trained in the vertical direction by the swing arms, now rotated to a raised position.

FIG. 4D is an end view showing an optional position in which the swing arms are now raised to a second lift position by vertical translation rather then rotation.

FIG. 5A shows a swing arm notched for adjustable length. The notches catch the swing arm pivot element.

FIG. 5B shows a swing arm slotted for variable length.

FIG. 6A shows a trailing catch wire hanging by means of an elongated connector from a point on a swing arm. The elongated connector supports a single supported catch wire. This arrangement may be used on either or both swing arms.

FIG. 6B shows the swing arms, elongated connector and trailing supported catch wire in final position. The catch wire attached to the elongated connector collects the shoots that may have escaped the swing arm grids and/or the late growing shoots that have not grown long enough to be associated with the initial raising of the grid.

FIG. 8A describes the criteria for rotating a swing arm for the first time.

FIG. 8B describes the criteria for raising a pivot element for the first time.

FIG. 8C describes the criteria for raising a pivot element for the second time if needed.

FIG. 8D describes the criteria for rotating a swing arm for the second time if needed.

FIG. 9A is a depiction of a comb shaped grid used vertically when training vines and vine shoots growing in proximity to the ground.

FIG. 9B illustrates a simple grid with only two longitudinal elements. The transverse elements can be straight or curved.

FIG. 9C is a depiction of a concatenated sequence of loops joined so as to create a grid. This can be viewed as two longitudinal elements with repeated pattern, connected at their cusps by transverse elements.

FIG. 9D shows a grid created by two longitudinal elements connected by a third repeatedly crossing transverse element. This may be viewed as two longitudinal elements connected by a plurality of oblique transverse elements.

FIG. 9E depicts a grid with three longitudinal elements.

FIG. 9F illustrates a grid with four longitudinal elements. A grid can contain any number of longitudinal elements, and the grid can be supplemented by separate wires acting as longitudinal elements.

FIG. 10 shows a swing arm with teeth-like knuckles configured to both capture pivot element about which it rotates and also mate with opposing swing arm. The assembly at the pivot end is referred to as a barrel.

FIG. 11 shows two swing arms configured to mate concentrically.

FIG. 12 shows a swing arm with a continuous cavity at one end for a pivot element, which pivot element could be a rigid shaft such as nail, screw or hook, or more elastic element such as a wire, rope or cable. It also displays a curved section designed for optimum capture of new shoots. Several detailed views are shown to illustrate various features. View "C-C Optional" illustrates an optionally removable arm.

FIG. 13 shows a side view of a swing arm with grid attached, capture position. A swing arm support wire is indicated in the drawing, but any pivot element can be used. View A-A shows two swing arms in capture position. Circles on arms indicate possible locations of longitudinal grid elements or supported wires. These locations can be on the convex, concave, outside or inside of the swing arms.

FIG. 14 shows two opposing swing arms in capture position, with new growth finding their way through grid and or longitudinal wires.

FIG. 14A shows the swing arms of FIG. 14 rotated to a horizontal position, with captured shoots retained and growing through grid. The swing arms can be lifted (raised vertically) by moving the pivot element (swing arm support wire in this case) to a higher vineyard post clip.

FIG. 15 shows the pivoting end of a swing arm mounted on a pivot element, which in this illustration is a swing arm support wire. A grid is shown attached to the swing arm.

FIG. 15A shows two opposing swing arms prior to connection on pivot element.

FIG. 15B shows two opposing swing arms intercalated and interlocked in a coupled position.

FIGS. 20A-20D show curved swing arms in capture and various angled positions.

FIG. 20A shows curved swing arms in capture position.

FIG. 20B shows curved swing arms in about 90 degrees position (with respect to each other).

FIG. 20C shows curved swing arms in 180 degree (horizontal) position. It also shows how two swing arms are held in position using an adjustable brace. The support arms attach to a post, and pivot to meet the various positions of the swing arms.

FIG. 20D shows curved swing arms in about 270 degree position.

FIG. 21A shows curved swing arms in capture position with sliding longitudinal elements.

FIG. 21B shows curved swing arms in raised position with sliding longitudinal elements. Arrows show how longitudinal wires are relocated.

FIG. 22 shows an alternate method to secure a swing arm to a pivot element, using a hook like end treatment with spring closure.

FIG. 22A shows a barrel with alignment holes.

FIG. 22B shows two arms joined using alignment holes to lock arms in preset positions.

FIG. 23 shows how a flat grid can be shaped to fit over a contoured swing arm.

FIG. 23A shows how a separate grid can be attached to each arm or continuously over two opposing arms.

DETAILED DESCRIPTION

Figure 1A:
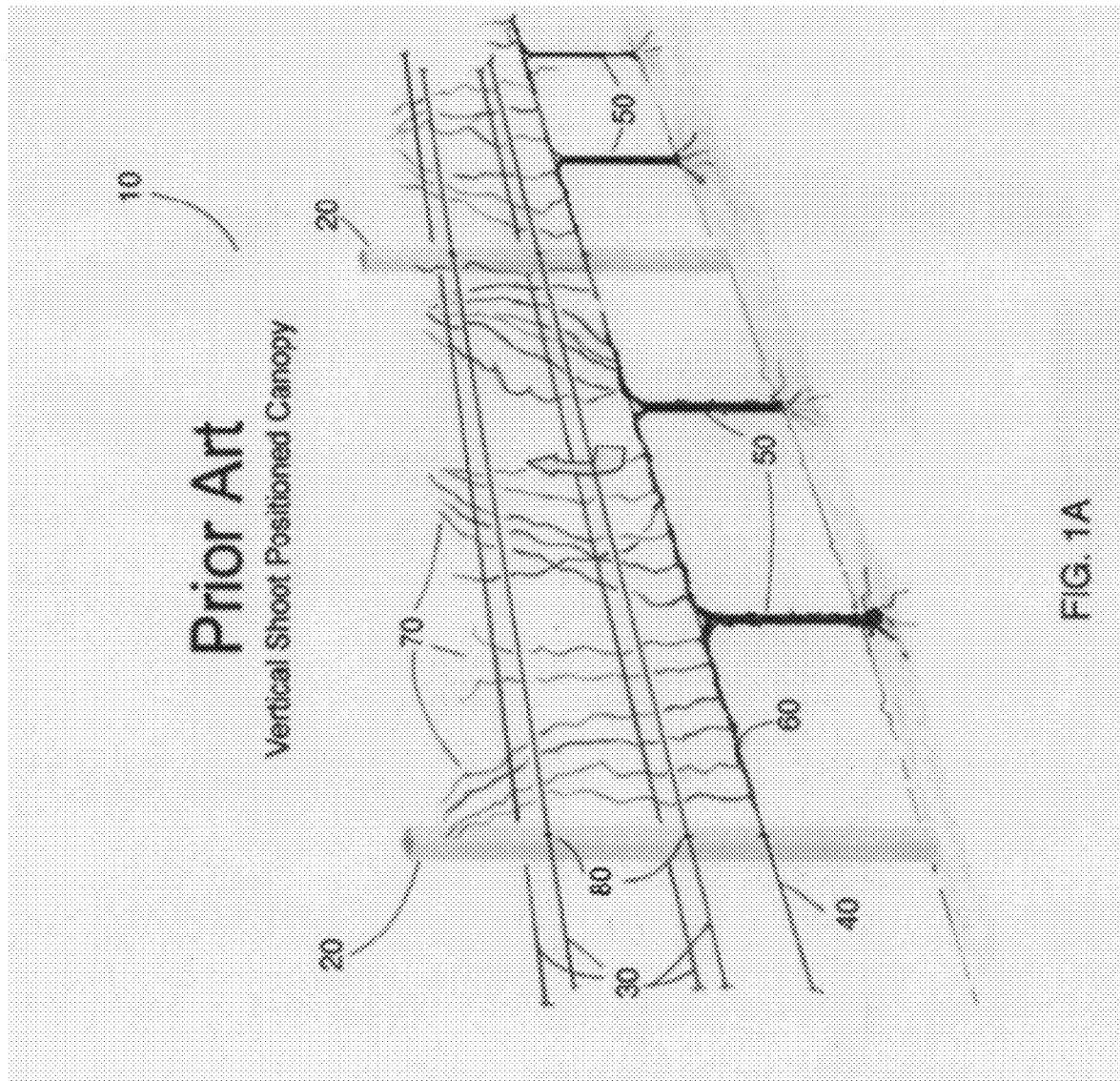
FIG. 1A is a perspective view depicting the prior art Vertical Shoot Positioned canopy, showing how shading occurs when shoots bunch together.

In this section the new inventive methodology will be applied and the resulting benefits will be evident. When the new method is applied to training grape vines it is preferably referred to as the Swing Arm Training System. In the drawings, the same reference numerals indicate like elements throughout the several figures, as follows:

10 Canopy
20 Post
30 Catch wire
40 Fruiting wire
50 Grape vine trunk
60 Cordon or cane
70 Shoots
80 Post clip
100 Grid
110 Transverse element of grid
120 Longitudinal element of grid
170 Grid clip
180 End joint (male)
190 End joint (female)
195 Grid socket for catch wire
800 Flow chart illustrating method of use The SATS shoot positioning system is a concept that improves both quality and production costs over the existing methods because it provides lateral support to vine shoots 70 as opposed to the prior art of only providing vertical support. In addition, it fixes the vine shoot in an optimum location within the trellis for the life of the growing cycle, which eliminates the need to reposition shoots as the season progresses. Because the grapevine canopy will now have its shoots more evenly distributed and fixed in place it increases the vines' ability to produce higher levels of quality fruit.

Although some embodiments are described in conjunction with training vines and shoots in a grape vineyard, the embodiments are applicable to many other vine and vine shoot training systems.

THE SWING ARM

The proposed swing arm is a means to support a wire or system of wires or grid configurations. It can be used in agricultural applications such as in a trellis system that is used to support vines and climbing vegetation. It can also be useful in any other applications that utilize a system of wires that have a mobility requirement.

The following text shows how the arm design features work together with a grid and or a set of wires parallel to the fruiting wire to control the direction of vine growth and support that growth for the growing cycle.

The arm is mounted on a pivot element (often a swing arm support wire is used as a pivot element) that serves to position the arm and provide a hinge that is the center of rotation for the device. See FIGS. 15 and 20A-20D for example.

In an embodiment, the support wire is attached to each post using a common commercial fastener used in catch wire systems. The fastener provides a temporary connection between wire and post but allows the wire to be removed and re inserted into another fastener at a different location. With an arm now mounted on a movable wire it has the flexibility to be active at any desired vertical position within the limits of the vineyard posts. This is in contrast to any fixed arm that may have been previously used. FIG. 14A shows how the support wire can be raised bringing the arms, grid, and foliage further upwards as required.

In one configuration the arm is designed to be attached to the support wire (pivot element) by use of a narrow slot providing an entry point for the wire. See FIG. 12 view A-A and C-C. FIG. 12, View C-C Optional, shows a flared slot being used and an optional removable handle to accommodate one barrel size but interchangeable handles.

In an embodiment, each single arm is designed so that it can be mated with another single arm to form a swing arm assembly consisting of two opposing arms but working together to support a grid. This provides transverse and longitudinal support for the training grid as shown in FIGS. 12 through 15B.

When two arms are used as a system, the location of the entry slots are arranged so that they move in opposing directions as each arm rotates around the center pivot point. This action prevents the swing arm from disengaging from the wire. See FIGS. 15A-B. A unique feature of the slot system is that any arm can be disengaged from the wire or pivot element as needed and at any time by rotating the two arms back to the entry position and lifting the arm from the pivot. This would be useful when replacing a damaged arm, changing to a different length of arm or for any reason that requires removal.

When the two arms are mated and closed this is called the capture position. See FIGS. 13, 14, 17, 18, 20A and 21A. In this position the arms and attached grid will "capture" the new emerging shoots within the openings of the grid. It is critical for the grid to be positioned in the most advantageous location with respect to the new emerging shoots. A uniform shoot distribution within the mature canopy is strongly encouraged by the initial grid location in the capture position.

Figure 18:
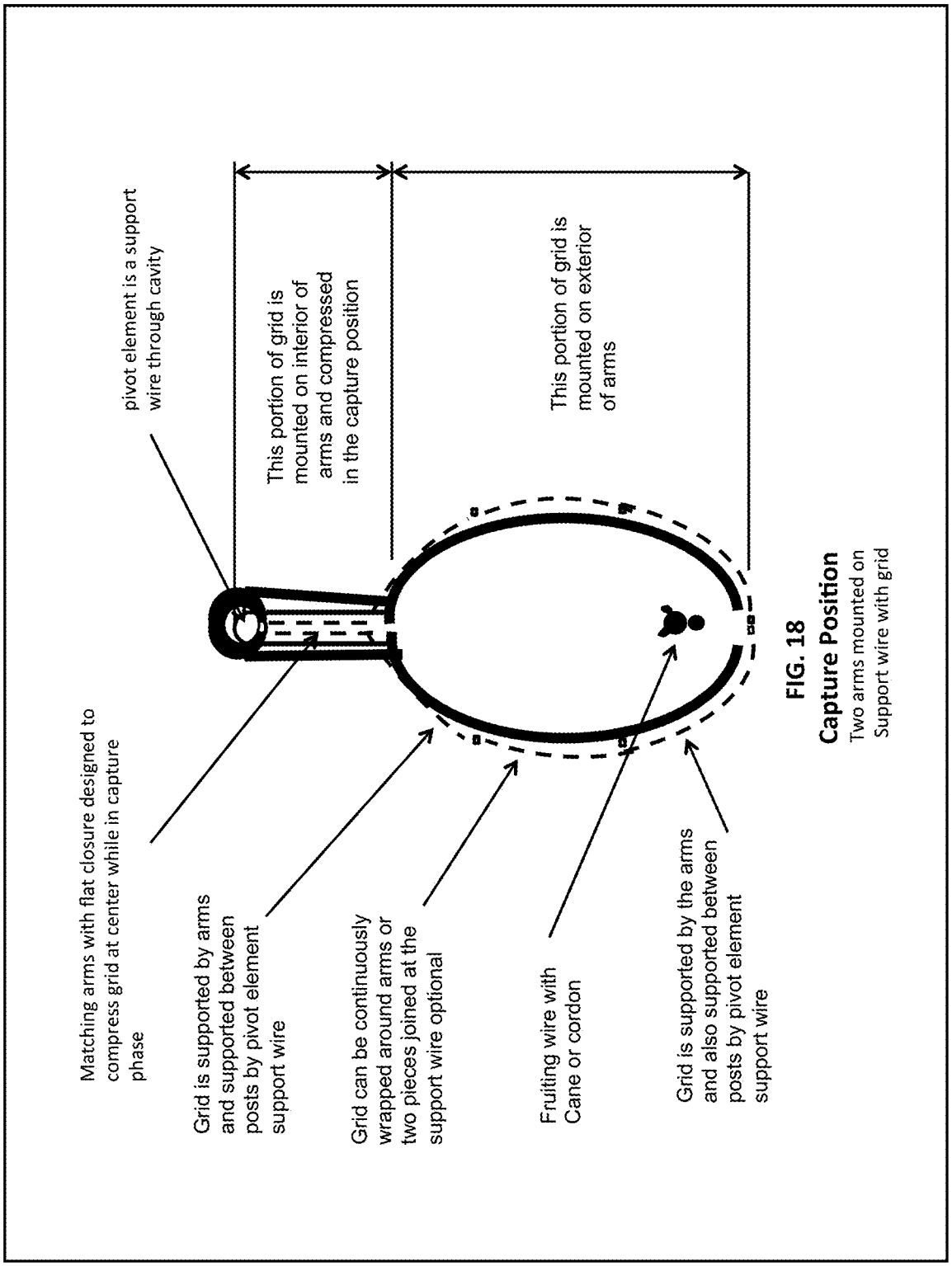
FIG. 18 is a detail view of curved swing arms with a flat closure section and attached grid.

The arms can be configured in many different ways. FIGS. 2A through 4D, 10 and 11 illustrate straight arms. On the other hand, FIG. 14 and others show a more sophisticated design that has features that promote successful vine training. As seen in FIGS. 12 and 18 the first few inches of the arm from the pivot element can be straight as opposed to the shape of the remaining arm. When the two arms are in the capture position this feature promotes the center of the attached grid to be unavailable to capture new shoots. This is desirable because as the shoots grow through the grid and combine to form the grapevine canopy it forms a separation between front and back portions of the canopy, thus allowing additional space for airflow, sunlight and future lateral growth.

Also seen in FIGS. 12, 13, 14 and 14A the lower portion of the arm can have a curved profile. When the two arms are in the capture position the combined arms form a curved enclosure surrounding the cane or cordon and this curved shape encourages the newly emerging shoots to become more evenly distributed within the grid openings.

To further clarify the swing arm's role in the overall training system an order of support is presented:
1. post or posts are supported by the earth
2. A clip, staple, or fastening device is attached to and supported by the post.
3. a swing arm support wire or wires are supported by the post and fastening device.
4. a swing arm or arms are supported by the wire or wires.
5. a grid or additional wire or catch wires are supported by the swing arm.
6. the foliage is contained and supported by the grid or catch wires The Grid The swing arm and its associated grid are the physical objects that make the SATS concept possible and are configured to provide a barrier between foliage shoots 70 as they grow.

The term "grid" defines an overall structure that is comprised of a plurality of geometrically configured parts that are arranged to be placed in close proximity to a living vine and is used to control the direction of foliage growth. The grid is configured and sized to separate shoots in a vineyard in order to reduce foliage overlap. The grid is supported by a grid arm which allows the grid to be vertically and rotatively adjusted to train shoots as they grow.

Referring to FIG. 9A through 9F, the use of the word "grid" in this description includes but is not limited to a plurality of transverse elements 110 connected to one or more longitudinal elements 120.

Grid as Matrix of Openings

Referring now to FIGS. 9A-9F, a grid may be viewed as a matrix or array of openings or spaces. The terms matrix and array are used interchangeably, and the terms opening and space are used interchangeably in this description. For example, the grid of FIG. 9E may be viewed as a matrix of 16 openings associated with and separated by transverse and longitudinal elements. The matrix of openings is a linear array which is substantially longer than wide, usually by a factor of at least nine to one (length to width).

The purpose of the grid and its associated array of openings is to capture shoots; to partially or completely separate shoots; and train the shoots, as shown in FIGS. 2B and 2C, for example. Although the grid openings need not be spaced exactly in accordance with the spacing of the shoots, nonetheless it is preferred to bear in mind the grapevines' growth and culture requirements. In an embodiment, grids have openings that match the ideal shoot spacing required for a given variety and distribute that spacing along the fruiting wire providing a barrier between shoots. For example, *Vitis vinifera*, the most common wine grape type, includes such cultivars as Chardonnay, Cabernet Sauvignon, and Pinot Noir and their ideal shoot spacing is from 4 to 6 shoots per lineal foot of trellis. Accordingly, the corresponding grid can be made to provide 4 to 6 openings per lineal foot. On other varieties, such as many hybrid varieties, the shoot spacing is recommended to be closer, ideally between 6 to 10 shoots per lineal foot and the grid can be configured to match that recommendation. A good compromise setting is about 6 openings per linear foot. For vines other than grapevines the grid openings are spaced relative to the growth pattern of that type of vine.

One embodiment doubles the number of openings per lineal foot in the grid pattern with respect to the ideal shoot spacing for a given variety. For example, rather than use 6 openings per lineal foot, the corresponding grid may be made to provide 12 openings per lineal foot to tighten control of each shoot and to leave an empty opening between shoots for better protection against foliage shading. In this way the shoots will on average be more consistently separated for better avoidance of shading because of the empty grid openings between shoots. Such separation may also be achieved by multiple longitudinal rows of openings as shown in FIGS. 9E and 9F.

In some embodiments it is advantageous to use relatively large grid openings, that is, more than one shoot per opening, in order to accommodate a variety of swing arm and associated grid angles.

For manufacturing purposes a small number, such as two or three, of grid sizes can be made and these would approximately satisfy the grid requirements for vines of different kinds, even though it may not be the ideal spacing for every kind of vine, yet still function adequately. Grids can also be made with irregular spacing of the transverse grid elements, although this may be less desirable from a manufacturing viewpoint.

The intention is to capture as many shoots in the grid as possible even though a few may escape due to the unpredictable nature of vine growth. There may also be cases in which a plurality of shoots will occur in one grid opening but this is acceptable as at least partial separation of shoots is accomplished. Where relatively large grid openings are used, more than one shoot per grid opening would be acceptable.

In special situations, such as growing vines in very hot climates, some shading of fruit may be desirable. Using the SATS method, the shading can be more precisely controlled. More accurate growth direction may be encouraged resulting in fruit shading but not leaf shading. Thus, in any situation, the SATS method provides another tool for vineyard management.

Grid as Interconnection of Transverse and Longitudinal Elements

As mentioned, the use of the word "grid" in this description includes but is not limited to a plurality of transverse elements 110 connected to one or more longitudinal elements 120. Transverse elements are also referred to as first elongated elements and the terms are used interchangeably; longitudinal elements are also referred to as second elongated elements and the terms are used interchangeably. Transverse elements need not be perpendicular to longitudinal elements. Transverse elements need not be parallel to other transverse elements. Generally the grid of interest is a linear grid, meaning a grid substantially longer than wide, usually by a factor of at least nine to one (length to width).

Grids may be made of flexible or rigid material. Since the grid's function is to separate shoots, it may have any of a variety of shapes including ladder-shaped grids as illustrated in FIG. 9E as well as comb-shaped grids shown in FIG. 9A. The latter is a depiction of a comb shaped grid for use when training vines and vine shoots growing in proximity to the ground. The teeth of the combs correspond to transverse elements, and the back of the comb to a longitudinal element.

The transverse elements need not be in the shape of straight lines. They may be curved as exampled in FIGS. 9B and 9C, and the plane containing the curve may be in any direction. The transverse elements can be formed as part of a continuous line as in FIG. 9D.

FIG. 9C is a depiction of a concatenated sequence of loops joined so as to create a grid. FIG. 9C can be viewed as two patterned longitudinal elements (the upper and lower parts of the loops), connected by transverse elements joining the upper and lower longitudinal elements at their cusps.

FIG. 9D shows a grid created by two longitudinal elements connected by a third element crossing back and forth between the two longitudinal elements. For the purposes of this specification, however, it is equally valid to view this grid as two longitudinal elements connected by a plurality of sloping transverse elements.

FIGS. 9E and 9F illustrate grids with more than two longitudinal elements.

The grid can be prefabricated or fabricated at the site of use.

The grid can be made of a metallic substance such as, but not limited to, steel, copper, aluminum, silver, iron, or any other of the elemental metallic or alloy substances. The grid can be made of a synthetic compound such as, but not limited to, nylon, acrylic, polyester, carbon fibers, polycarbonates, or any other combination of synthetic or synthetic and natural substances. The grid can be made of any animal, vegetable or mineral natural material. The grid can be made of any regenerated, recycled, semi synthetic, synthetic, mineral, polymer, natural or man-made compound. The grid can be made from a flexible, semi flexible or rigid material. It can be of fixed dimensions or have the capability of stretching or compressing.

The longitudinal and transverse elements can be attached to each other by many means, such as: welding, adhesion, wrapping, and insertion. Thermal joining such as spot welding is performed based on properties of the material used. Adhesive bonding is another approach. Wrapping is illustrated in FIG. 9D. An insertion technique is possible in which transverse elements are inserted and captured in a longitudinal element. These examples of grid assemblage are shown to illustrate the range of possibilities and are not meant to be limiting.

The width of the grid is measured in a perpendicular direction from the long axis and is measured horizontally with respect to the position of function. The size of the grid will vary according to the intended grape vine usage and preferably will vary in overall width from 1 inch to 48 inches. For specialty crop use, the width can be less than 1 inch and can exceed 48 inches as required for the application.

The length of the fabricated or pre-fabricated grid is measured along the long axis when in the normal position of function. In the case of trellised grape vines this dimension is parallel to the long axis of the trellis. The preferred fabricated length can be from 1 inch long to an unspecified length, which is limited by the manufacturing and logistic conditions and is cut to fit specific field conditions.

The thickness of the grid material is preferably from 1/64 inch to 1½ inches depending on application requirements, but can be smaller or larger if desired.

The geometric shape of the grid components, which together make up the assembly in whole, can be triangular, rectangular, square, polygons with any number of sides, circular, oval, curved, annulus, crescent, elliptical, segments and sectors of shapes, or any combination of the above. The cross section of the longitudinal and transverse elements may be different, and may be of any shape such as triangular, rectangular, square, polygonal of any number of sides, circular, oval, curved, annulus, crescent, elliptical, segments and sector of shapes, or any combination of the above. In general, grid openings are sized between 10 to 60 square inches, but can be smaller or larger if desired.

Grids may be rigid or elastic.

The grid may be any color, can be coated with any material that enhances the performance such as Teflon, rust proofing, galvanization, paint or similar coatings. The grid may be made of a biodegradable material.

The grid can be shortened or lengthened as desired to fit any desired length. Any method of attaching two grids together to create a longer grid may be used, and are not limited to the examples illustrated.

In some cases, a simple grid consisting of only a few longitudinal elements, such as two such elements as seen in FIG. 9B, can be supplemented by separate wires that are used as longitudinal elements of the grid even though they may not be attached to the grid. The purpose of this is that the separate wires can be adjusted into different positions to improve the equitable distribution of shoots in openings.

Another factor of the SATS grid is the overall flex and strength characteristics that are addressed when designing the specific system for use. In some embodiments the SATS grid can be designed, for instance, to have the specific rigidity, anti friction qualities (smooth surfaces) and sizing of the openings to make the motion smooth and efficient and help to overcome resistance from foliage and tendrils.

System Including Swing Arm and Grid

The grid can be moved and relocated on the trellis or bare foliage as often as the user deems necessary. The number of moves required to complete the objective is entirely up to the user and is understood as being part of the intended use of the grid. Typically two moves are satisfactory, and sometimes one move is sufficient to properly retrain the vine.

A grid that is a component of a SATS system needs a foundation or a support that is positioned within the canopy so as to enable the grid to perform various functions resulting in the successful cycle of capturing emerging shoots from new buds, guiding the shoots in the desired direction, holding the grid in place, and having the capability of moving within the canopy to serve all the growers canopy management needs.

Using a swing arm as a link between the grid and the other various trellis components, such as posts, support wires, trellis hardware, and the vegetative vine growth itself is described here.

The function of a swing arm is to support and to efficiently capture shoots, then raise or lower the grid while retaining and spreading the foliage at the same time. The arms, grid and support wire (or other pivot element) act together as a system and they extend the entire length of the trellised row. Various embodiments of swing arm/grid combinations are described in the following examples.

In the case of a standalone embodiment, the swing arm and associated grid may be lowered to its capture position, allowed to rotate freely, and then allow the actively growing shoots to suspend the swing arm and associated grid when enough foliage has grown to support the free grid. The grid and swing arms will move upward with the growing foliage, providing some degree of separation.

The swing arms containing the grid may be directly attached to a post, and the assembly can then be pivoted using the post attachment point as the center of the swing arc.

The swing arms and grid may be used with any available post size and configuration including wooden posts, metal posts, and posts of a synthetic The swing arms may be made of any material, including metal, plastic or wood. They may be of any cross-sectional shape such as circular, triangular, rectangular, square or other. They may be rigid or flexible.

The grid may be attached to the swing arms by glue, staples, hooks, welding, screws, nails or any other fastening mechanism.

The swing arm may be covered with mating strips of Velcro, one strip attached (such as glued) to the swing arm, the other part removable so that the removable strip is removed, the grid set in place upon the non-removable Velcro strip, and the removable strip then set upon the grid so that the grid is sandwiched between the mating Velcro strips. This holds the grid in place on the swing arm and allows the grid to be easily replaced if desired (in case of a damaged grid or the desire to use a different size grid opening).

The pivot end of the arm may be designed to snap on to the pivot element without the need for a barrel-like assembly. An example is shown in FIG. 22.

The swing arms may be attached to supported wires by means of snapping into, tying to, clipping onto, or otherwise attaching to supported wires. As an example, see the expanded detail drawing in FIG. 7, labeled "Grid formed with cavity to attach field support wire." The cavity is formed to grasp the field support wire, with enough clearance to enable the cavity to slide over the field support wire when in position.

To augment the capture of new growth, the wires or outermost grid longitudinal elements at the distal end of two swing arms may be fastened together in capture position for more complete capture. We refer to this as "locking" the swing arms together in capture position. They can be unlocked when it is time to rotate the arms apart.

Various embodiments may be utilized to lock the swing arms together. The swing arms may be locked together directly, or the attached grid or field wires may be locked in addition to or independently of the swing arms. The swing arms can be locked using any of the methods illustrated in FIG. 19, 19A, or 19B. These include locking by magnetic attraction, by friction fit, or by hooking them together. The field wires or distal-end grid longitudinal elements may be used with a cavity cast into the field wire or distal longitudinal grid element to mate with its opposite element on the other arm, such as use of: an "S" or other intricately shaped cavity that retains wires by requiring complex motion to escape. Other methods are: a force fit in a tight cavity in which considerable force is required to extract the wire; a cavity, such as a conformal cavity, with elastic walls that make exit difficult; and in general any configuration that retains the support wire once it has been inserted into the cavity or socket. In some embodiments it may be preferred to have a loose fit of the grid cavity onto the catch wires for ease of sliding the grid or grid elements with respect to the catch wires. The clearance is sufficient to allow movement, while the lip or shape that captures the catch wire must encompass the catch wire sufficiently to retain same under normal use.

Turning to the pivot end of the swing arm, in one example the swing barrel (a.k.a. knuckle) has slots for wire entry, as shown in FIG. 10 (or flared slot, as shown in FIG. 12, View C-C Optional). The purpose of the gap between knuckle loops is to allow a swing arm of the same configuration on the other side of the trellis to intercalate on the same support wire in substantially the same position on the support wire.

In another example, two swing arms, on opposite sides of the trellis, are attached to their common support wire by means of a concentric arrangement wherein one arm rotates on an inner (male) shaft which slides and rotates within a concentric outer (female) shaft. See FIG. 11. Another example of the intercalation of the knuckles is shown in FIGS. 15A and 15B. In this way both arms can rotate independently while being substantially in the same location along the support wire.

DESCRIPTION OF DRAWINGS

FIG. 1A. Shows a prior art vine training method known as Vertical Shoot Positioning System. Notice in particular how the prior art allows the shoots to bunch up along the row, resulting in shading and reduced sunlight.

FIGS. 2A through 4D illustrate how and when to place and adjust a prefabricated swing arm-grid using the SATS system. Although not shown in these drawings, the swing arm supports a grid and or set of field wires that capture, separate and train shoots to grow with reduced shading.

FIG. 2A through FIG. 2C show how two swing arms can be mounted on a pivot element, in this case a support wire passing through the centerline of the trellis post. The support wire is inserted through drilled holes located at the post centerline and approximately 13 inches above the fruiting wire, although any appropriate height above is acceptable. This support wire is the attachment point for the swing arms at each post and also attaches to the grid between posts.

FIG. 2A shows the arm in the "capture" position. The arm along with the support wires and grid are placed in this position while the buds are dormant and, once growth begins, the new shoots pass through the grid openings and continue to grow.

FIG. 2B shows the new shoots after substantial growth has taken place.

FIG. 2C shows how the arms can be pivoted upward bringing all the captured shoots into a nearly vertical position. The arms can be freely rotating supported by the upward growth of the foliage, or the arms can be manually moved, or moved by any other mechanism including by field wires at the distal end of the arm. In this position the canopy has reached its desired architecture and remains until harvest.

FIG. 3A through FIG. 3D show how two swing arms and their associated grids can be mounted on the outside of the trellis posts. Support wires are attached to the post surfaces using standard trellis hardware staples that allow the wires to be removed and re-attached.

FIG. 3A shows the configuration of the swing arms in the "capture" position. The arms along with the support wires and grid are placed in this position while the buds are dormant and, once growth begins, the new shoots pass through the grid openings and continue to grow.

FIG. 3B shows the new shoots after substantial growth has taken place.

FIG. 3C shows how the arms can be pivoted upward bringing all the captured shoots into a nearly vertical position. In this position the arms are fully raised and the canopy may have reached the desired level of its desired architecture. If so, the arms and grid can remain fixed in place until harvest.

FIG. 3D shows an optional position that raises the swing arms and associated grids an additional desired vertical distance. A second set of attachment staples are located approximately 6 inches above the bottom set. The supporting wires and their arms and associated grids are removed from the bottom set of staples and re-inserted in the top set. This gives the grower on optional lift position.

FIGS. 4A through 4D show how two swing arms can be mounted on a single support wire attached to the outside of the trellis posts. The support wire is attached to the post surface using a standard trellis hardware staple that allows the wire to be removed and re-attached. The wire is located on the same side of the post as the fruiting wire.

FIG. 4A shows the configuration of the swing arms in the "capture" position. The arms along with the support wire and grid are placed in this position while the buds are dormant and, once growth begins, the new shoots pass through the grid openings and continue to grow.

FIG. 4B shows the new shoots after substantial growth has taken place.

FIG. 4C shows how the arms can be pivoted upward bringing all the captured shoots into a nearly vertical position. In this position the arms are fully raised and the canopy may have reached the desired level of its desired architecture. If so, the arms and grid can remain fixed in place until harvest.

FIG. 4D shows an optional position that raises the grid an additional desired vertical distance. A second set of attachment staples are located approximately 6 inches above the bottom set. The supporting wires and their arms and associated grids are removed from the bottom set of staples and re-inserted in the top set.

This gives the grower on optional lift position.

FIG. 5A shows a swing arm notched for adjustable length.

FIG. 5B shows a swing arm slotted for variable length.

FIGS. 5A and 5B illustrate a series of notches or slots in a swing arm that serve as optional pivot points for the center of the swing arc. This allows the effective length of the arm to be variable allowing the user a temporary way to limit the space occupied by the arms and grid within the aisles between vine rows. This would be desirable to let machinery pass while the arms go through the near horizontal range and upward into the final position.

FIG. 6A shows that an additional novel feature of the swing arm configuration is the placement of a catch wire that is suspended from a point on the arm by means of an elongated connector.

FIG. 6B shows that as the swing arm is raised along with the grid, a majority of the foliage is also raised into a nearly vertical position. However, late growing shoots and/or smaller shoots may not be caught in the grid openings at this initial raising of the arms and grid. With subsequent movements upward of the arms and grid that occur later in growing season, a trailing catch wire will follow the arms' movements pulling any remaining foliage into place.

Figure 7:
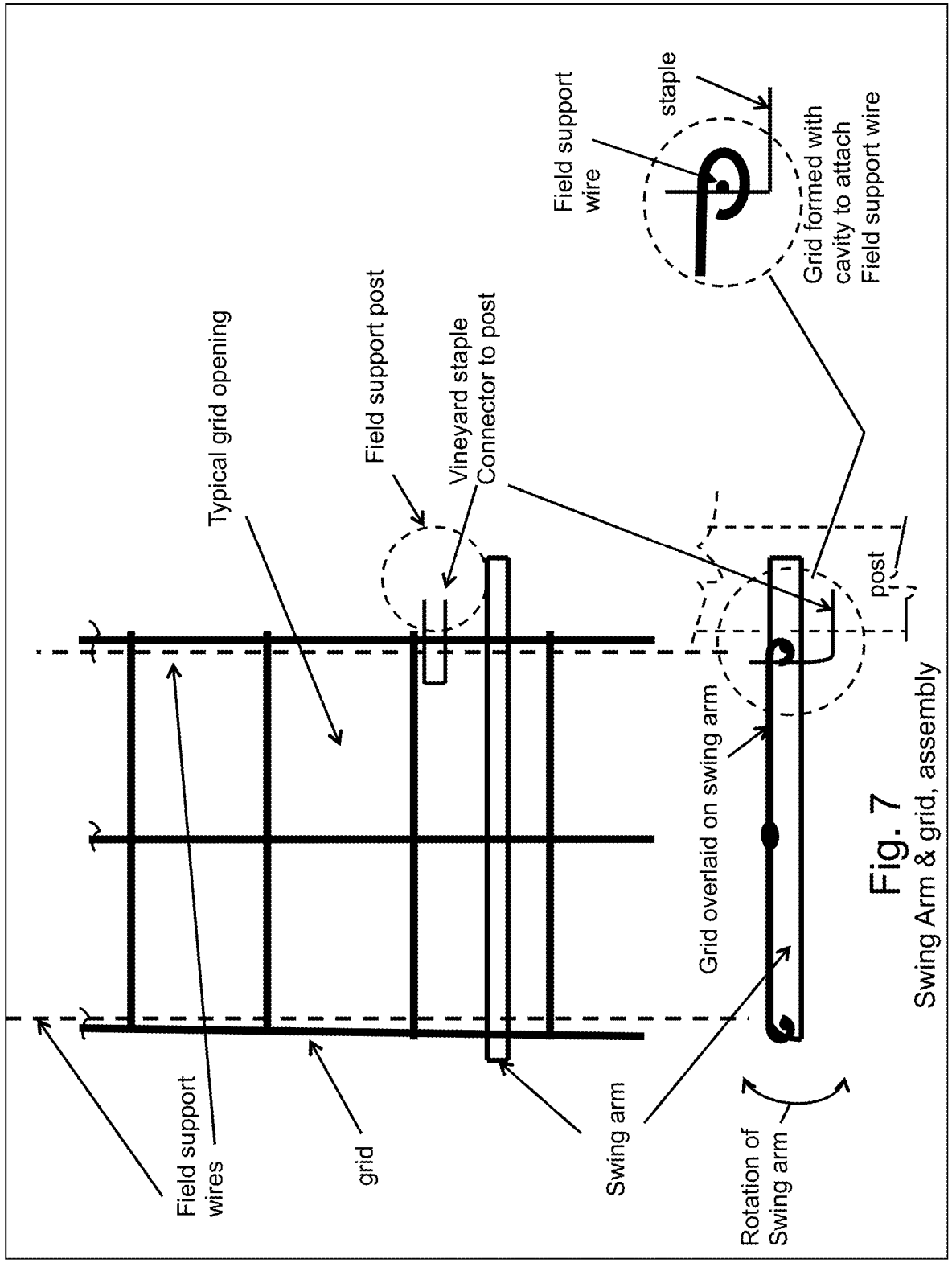
FIG. 7 shows an embodiment of a swing arm and grid assembly, and its attachment to a supporting post. The main part of the figure shows a plan (upper) view of the grid supported by a swing arm, which in turn is supported by a post. The lower view is an edge view of the assembly.

FIG. 7 shows an embodiment of a swing arm and grid assembly, and its attachment to a supporting post. This figure illustrates an embodiment of how the swing arm, grid, and support wires may be assembled.

FIG. 8 is a flow chart 800 illustrating an example embodiment for the timing of adjustment of the swing arms with its associated grid. This is explained in more detail in the "Method of Use" section.

In general, the goal is to capture substantially all shoots as they grow in the linear array of spaces, and to provide some separation of the shoots in order to reduce or prevent shading. However, where relatively large grid openings are used, more than one shoot per grid opening would be acceptable based on a minimum of shoot crowding due to the additional space that would be available.

FIG. 9A is a depiction of a comb shaped grid for use when training vines and vine shoots growing in proximity to the ground. The teeth of the combs correspond to transverse elements, and the back of the comb to a longitudinal element.

FIG. 9B illustrates a grid with curved transverse elements. The transverse elements can be straight or of any shape deemed effective for training shoots.

FIG. 9C is a depiction of a concatenated sequence of loops joined so as to create a grid. This can be viewed as two longitudinal elements with repeated pattern, connected at their cusps by transverse elements.

FIG. 9D shows a grid created by two longitudinal elements connected by a third element crossing back and forth between the two longitudinal elements. For the purposes of this specification, however, it is equally valid to view this grid as two longitudinal elements connected by a plurality of sloping transverse elements.

FIG. 9E depicts a grid with three longitudinal elements.

FIG. 9F illustrates a grid with four longitudinal elements.

FIG. 10 shows a swing arm with teeth-like protuberances (knuckles) configured to both capture the pivot element about which it rotates and also mate with opposing swing arm.

FIG. 11 shows two swing arms configured to mate concentrically. One arm rotates on an inner (male) shaft which slides and rotates within a concentric outer (female) shaft.

FIG. 12 shows details of a curved handled arm. Design features include a tooth-like knuckle configuration with a continuous cavity in the barrel portion that is used to house a pivot element, in this example a support wire that is common to other arms along the length of a grapevine trellis. The wire serves as an axle for the rotational movement of the arms. The tooth design allows two separate arms to be coupled with the common support wire thus forming a unified system that can then be re located anywhere in the vertical direction along the vine canopy.

A continuous slot is provided as an entryway for fitting the arm to the wire. This allows any arm to be attached or removed from the trellis wire as needed without additional manipulation of the wire or arms. The rotating action of the two arms closes the entry slot and prevents premature disassembly of the parts.

The shape of the arm includes a flat surface that when combined with a second arm forms a closure to compress the associated grid in the capture position. This is desirable when shoots are to be directed away from the center of the canopy as a final condition.

The arms curved shape also allows better distribution of shoots within the grid openings as they emerge from the cane or cordon.

The portion of the arm designated as the barrel, see FIG. 12, view C-C optional, is the housing for the rotative movement. It can be made as one piece monolithic with the arm or as an option it can be a separate portion that allows different arm configurations to be attached and removed.

FIG. 13 is an overview of how the various trellis components are used together with a swing arm. The views depict the arms and grid lowered into the position where the grid can capture the emerging shoots as they grow from the cane or cordon. The vineyard posts support a swing arm support wire that is connected to the swing arms and grid.

FIG. 14 shows how the foliage can grow through the openings in the grid. The combined curvature of two arms forms the grid into a cavity that gives the new shoots a near 360 degree enclosure forcing the growth to find an available grid opening and grow through as shown. Note that the flat sections of the arms combine to prohibit growth through that section of the grid. This creates empty grid cells near the pivot point of the arms for the length of the row.

After sufficient new growth has taken place the arms are rotated upward as shown in FIG. 14A. Note that the flat portion of the arms are now nearly horizontal and that the flat portions have prevented the grid from accepting any shoots. Most of the growth has been directed to the outsides of the canopy. This is desirable to promote sunlight penetration into the middle of the canopy.

Also shown in FIG. 14A is the use of clips or special staples to position the assembly further upward as shoots continue to grow. The clips are a standard vineyard hardware item and allow any wire to be secured to the post and then removed and replaced on an additional clip.

FIG. 15 is a perspective view of a swing arm and grid attached to a support wire. An additional arm and portion of grid have been omitted for illustrative purpose. When a second arm is attached to the wire as shown in FIG. 15B the two arms act as a rotative system that can raise and lower the grid by pivoting around the support wire.

FIGS. 15A and B show how two opposing arms combine to form a single working unit. Once the both arms have been placed over the support wire and rotated slightly upward they are bound together by the common wire through their cavities and further held in place by the contour of the opposing arm. The slots used for entry are now closed and the two arms are locked together to form a functioning unit capable of rotating around the pivot element.

Figure 16:
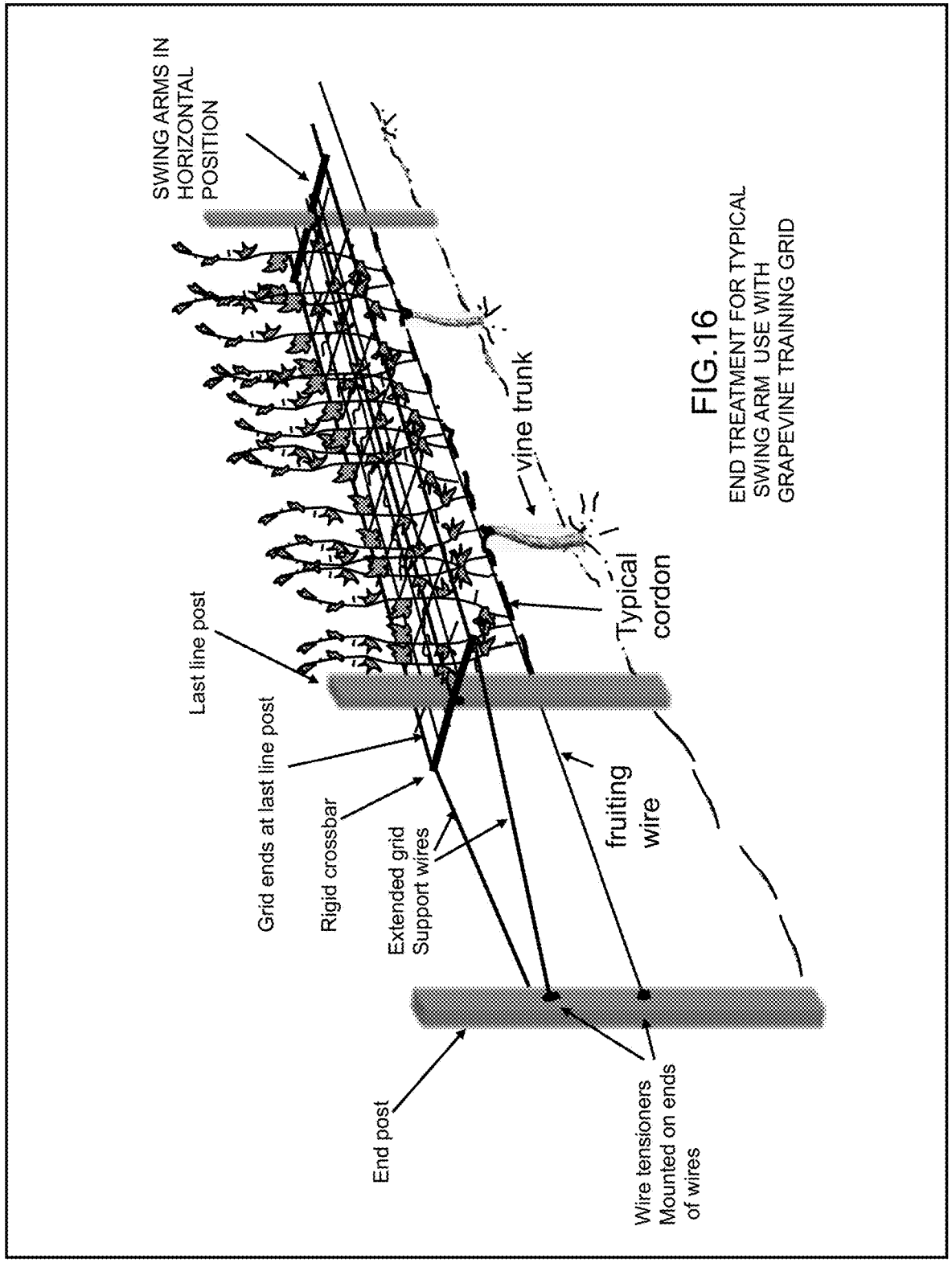
FIG. 16 shows a perspective of the swing arm system with swing arms rotated to a horizontal position. A method for terminating the wires and grid is shown.

FIG. 16 illustrates how a series of posts, support wires, grids, swing arms and trellis hardware act together as a system to control grapevine shoot direction and canopy form. It also indicates a method used to terminate the various components at the end of a row of vines. The wire tensioners mounted on the end post have multiple locations and can move vertically and be fixed in place to keep pace with the swing arm system as it is raised or lowered. A rigid crossbar is used to transition the grid from it's full width to the anchor points on the last post.

Figure 17:
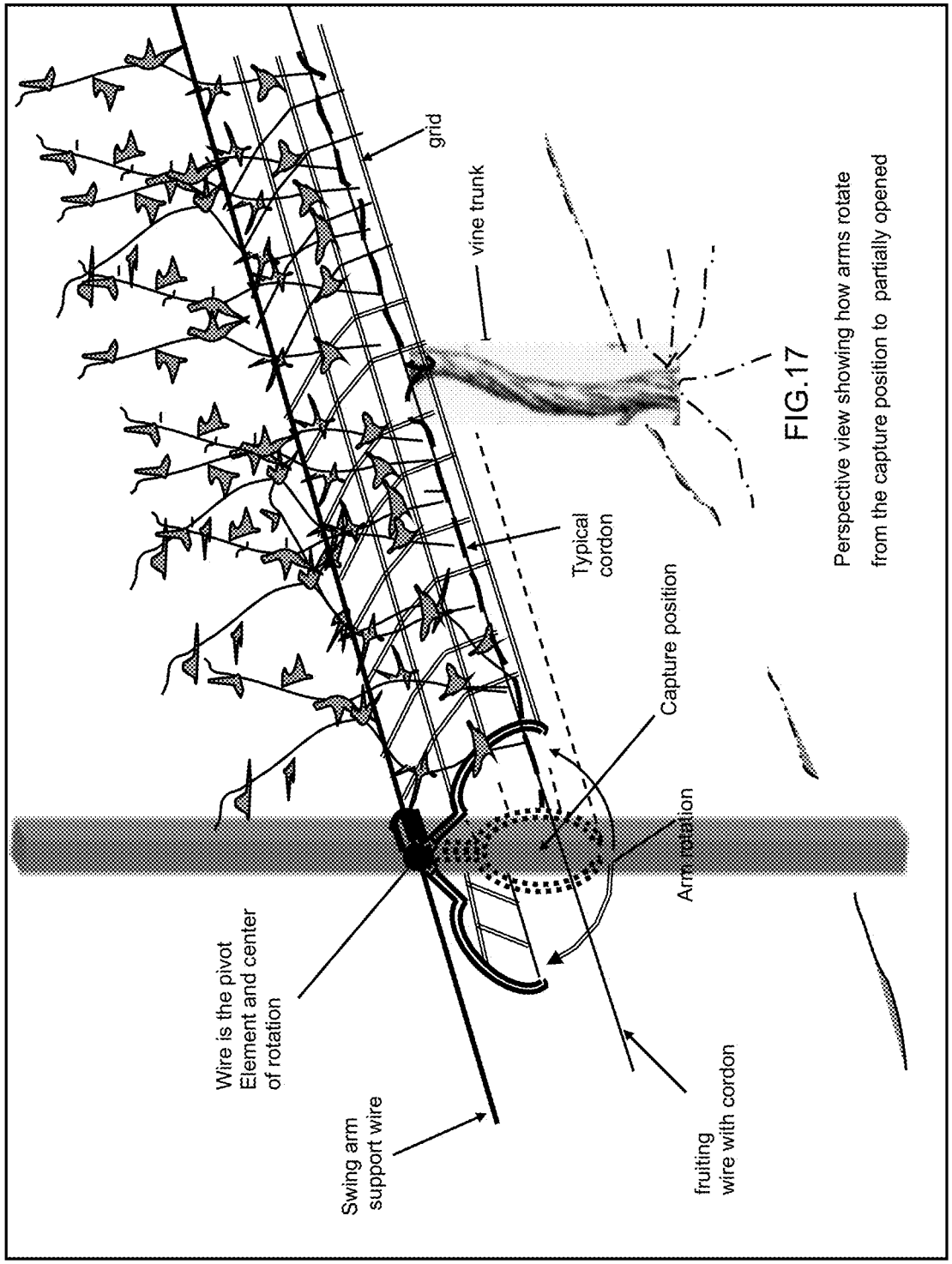
FIG. 17 shows a perspective of two swing arms with curved configuration and how it rotates from the closed position upward to a position that has partially raised the grid and accompanying foliage.

FIG. 17 shows a swing arm with a curved configuration and how it rotates from the closed position upward to a position that has partially raised the grid and accompanying foliage. Later in the growing season as the shoots elongate the rotation can be further adjusted to meet the growing needs. It is noted that the arm support wire passes through the barrel of the swing arms and acts as the center of rotation or pivot element. This novel characteristic allows the entire grid to be raised as the support wire is raised.

FIG. 18 is a detail view of the swing arms and grid. The fruiting wire and its associated cane or cordon are shown in the contained area made possible by lowering of the arms. In the curved arm grid shown here the grid material is placed around the exterior side of the arms and then compressed in the flat arm section near the center of rotation. The amount of grid material collected in the flat closure area depends on the desired amount of open space that will be resulting when the arms are raised and the grid is spread out to a near horizontal position. Initial position of the grids longitudinal elements and the relative position of the fruiting cane or cordon have an important influence on the dispersion of shoots after the arms are raised. Therefore, these factors can be varied to suit the variety that is being grown as well as the desired result.

Figure 19:
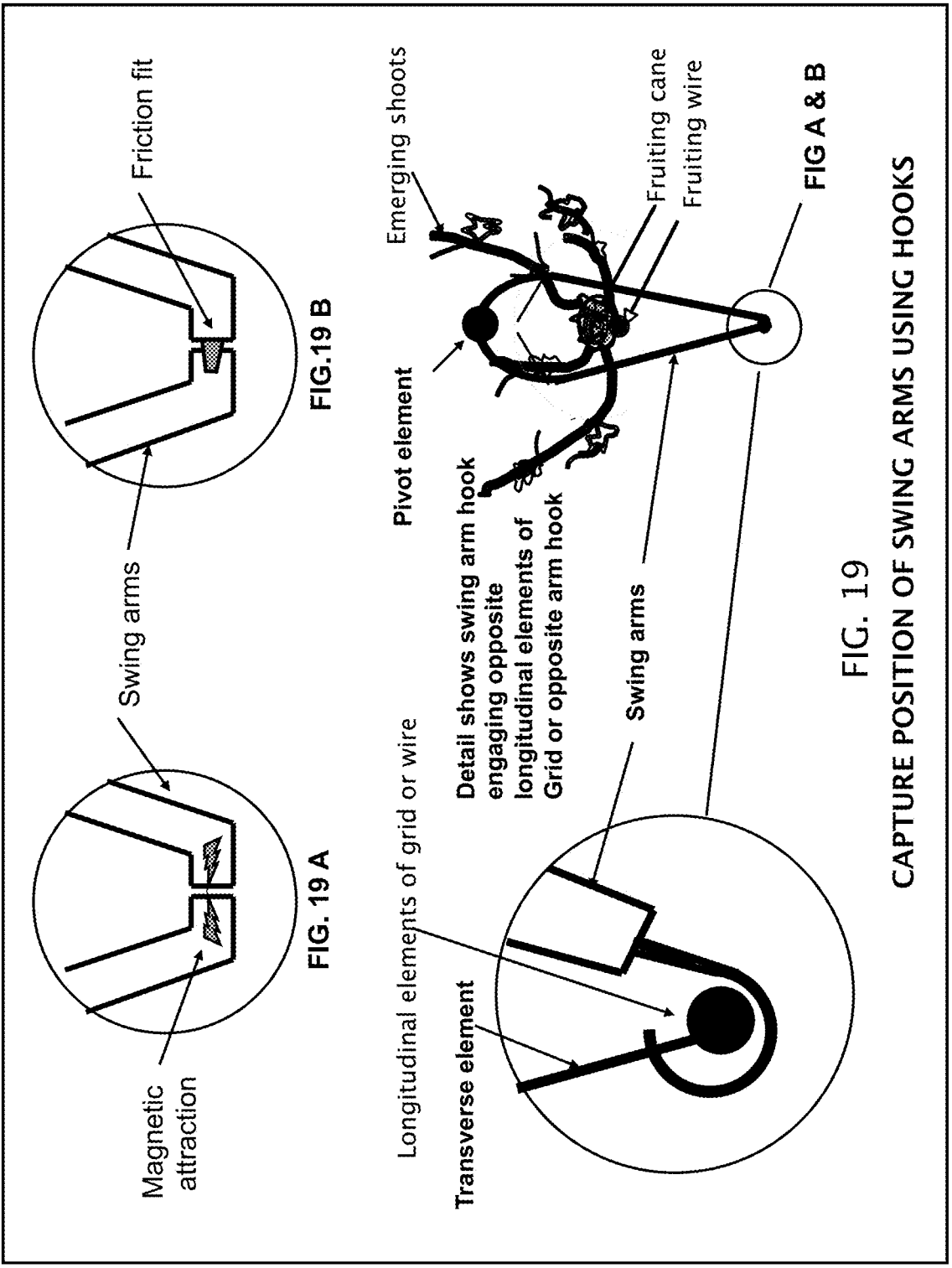
FIG. 19 shows various ways of locking swing arms together in capture position. They include magnetic attraction, friction fit, and hooks.

FIG. 19 illustrates the various ways a swing arm can be attached to either another arm or support wire or longitudinal element of the grid while in the capture position. The point of attachment is on the distal end of the arm and its purpose is to secure the grid in a near closed loop around the cane or cordon. When the arms are ready to be raised the attachment is disconnected and rotation of the arms can begin. FIG. 19A shows the distal ends of the opposing swing arms held together in a locked position by magnetic attraction. FIG. 19B shows the same for a friction fit between the arms.

FIGS. 20A, B, C, and D show how the Swing arms can be adjusted according to the growing cycle of the vines. Depicted here are various rotated arm positions ranging from closed at capture to fully rotated as may be required in FIG. 20D. Not shown in this figure, the arms can be repositioned vertically along the posts giving a variety of options for the user to control canopy shape and density.

FIG. 20C also shows how two swing arms are held in position using an adjustable brace. The support arms are made to attach to a post and pivot to meet the various positions of the swing arms.

FIGS. 21A and 21B illustrate how a swing arm may be used in an adjustable grid application. Shown is a grid with a single cell in the transverse direction and mounted on swing arms with fixed support wires at the distal ends of the arms and said support wires form fixed longitudinal elements. The grid provides the transverse elements (and just the outside longitudinal elements).

Wires a and b are positioned near the rotative end of the arm but are separated enough to accept a limited amount of foliage to grow between them. After growth has proceeded through the available spaces and the arms have been repositioned upward, the wires a and b can be moved transversely toward the distal end of the arms. This action forces the captured shoots outward and separates the canopy into the widened spaces shown as space a, b, and c.

The result is a way to manipulate the foliage according to the desired canopy shape and density.

FIG. 22 is a view of a swing arm with an end treatment that can clip over a pivot element. The clip over arm has a hooked end to contain the pivot element and a spring like closure element that traps the wire in position or releases it for the wire to exit the arm. An arm of this type can be used alone or used in combination with another clip on swing arm.

Applications using single arms on only one side of a grape vine canopy to direct foliage would apply to a situation where downward growing shoots and canopy exist. The single arm use is not limited to downward growing shoots but can be used as the conditions dictate.

Applications for using a pair of arms would apply to any situation where a grower needs support for wires or grids in an upward growing canopy.

FIG. 22A shows how strategically placed holes in the knuckle portion of the arm would serve to mate with another arm and lock in place upon alignment of predetermined holes. A pin would be inserted in the continuous holes after they align to secure the position. To rotate the arms to a new position would require removal of the pin and re insertion in another set of holes.

FIG. 22B shows how the two arms would rotate into various positions and lock in place.

FIG. 23 shows various ways to attach the grid to the swing arm. Although not limited to the methods shown the grid can be fastened to the arms by slots, grooves, or raised protrusions along the surface of the arm. Additionally, a Velcro system or permanent fastening such as gluing, plastic welding, or attaching only transverse or only longitudinal elements can be used.

FIG. 23A graphically depicts how a grid can be positioned around a support wire and arm in one continuous piece or how several grid widths can be used and fastened to form one complete containment area able to capture new shoots.

METHOD OF USE

Flow chart 800 provides an example embodiment for the timing of swing arm adjustment in both rotation and height (vertical translation). It corresponds to FIGS. 8A-8D.

Step 810 indicates this example applies to upward growing shoots.

In step 812 the pivot element is positioned above the fruiting wire prior to spring growth so that the swing arms, which are supported by the pivot element, can be placed in position to capture shoots as soon as the shoots arise. The pivot element is positioned in such a manner that the swing arms, when directed downward as in FIGS. 3A and 14, extend beyond the fruiting wire so as to capture the shoots as they arise from the cordon or cane attached to the fruiting wire. The position of the pivot element with respect to the fruiting wire can be seen in, for example, FIGS. 13 (View A-A), 17, 18, 20A among others.

In step 814 the swing arms are placed in position to capture shoots as they emerge from the cordon or cane. Thus the swing arms should enclose, as far as possible with the particular design being used, the fruiting wire and attached cordon or cane. FIGS. 4A and 4B, for example, show a suitable initial position of the swing arms when the arms are straight. In this case the arms can be initially placed in any downward position that captures most of the shoots, anywhere from 0 to 45 degrees from vertical. FIG. 14 shows the ideal capture position for curved swing arms. The swing arms enclose the fruiting wire and cordon or cane, thus effectively allowing grids and wires attached to the swing arms to capture shoots arising from the cordon or cane attached to the fruiting wire. The recommended positioning of the pivot element and attached arms with respect to the fruiting wire is illustrated in FIGS. 2A, 2B, 4A, 4B, 14, 18, and 20A among others.

Step 815 indicates the desirability of locking the swing arms together in capture position to prevent wind, animals and other forces from disturbing the swing arm capture position. FIG. 19 shows various ways (magnetic, friction fit, and hooking) of attaching the distal ends of opposing swing arms together in a secure manner until such time that they are later unlocked to accommodate growing shoots. FIG. 19 is applicable for curved swing arms. For strait arms (as in FIG. 4A) the downward (capture) position of the arms can be locked by means of an element or combination of elements connecting the opposing arms that holds them in fixed relative position.

Step 816 addresses when it is time to rotate the swing arms for the first time. The experienced eye will know when the time is right, but for the general user a set of criteria is offered for guidance. Any criterion or any set or subset of the following criteria may be used for guidance.

In step 816, after the shoots arising from the cordon or cane been captured as shown in FIG. 14, they need to be trained in the desired upward direction. Step 816 indicates that a criterion or criteria are established to rotate the swing arms for the first time as the shoots grow. FIG. 14A shows how the arms are rotated to guide the shoots in the desired direction while continuing to retain and maintain separation of the shoots. This training of shoots is accomplished by using a grid attached to the swing arms, or alternatively, using a series of parallel wires (like catch wires) that are attached to the swing arms, or using a hybrid method in which a grid is used that has a full set of transverse elements but few longitudinal elements, additional longitudinal elements being supplied by the set of parallel wires. A swing arm with grid attached is shown in FIGS. 13 and 15, and the case of arms with parallel wires attached is shown in FIGS. 21A and 21B.

Step 818 addresses the first criterion, i.e., rotating the swing arms for the first time before the tendrils start secure attachment. The more securely the tendrils attach, the harder it is to move the swing arm and, when moved, may damage the shoots.

The second criterion 820 is to rotate the swing arms about one week before immobility of the swing arm occurs. Mobility of the arm due to excessive growth can be tested occasionally, and when motion begins to be difficult, it is time to rotate.

A third criterion 822 is when the shoot height reaches about 2 feet.

A fourth criterion 824 is to rotate the swing arms for the first time before bloom occurs (but after shoot capture).

Figure 8A:
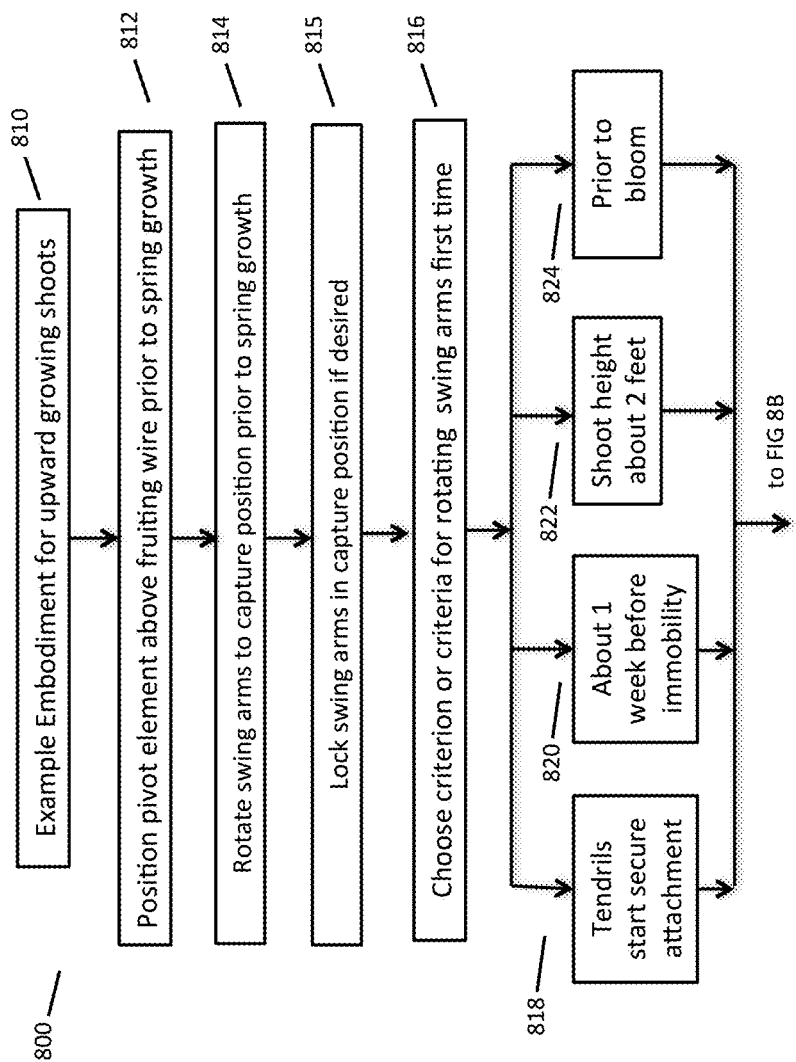
FIG. 8A-8D is a flowchart describing the training procedure for an example embodiment, with particular emphasis on the timing and criteria for grid adjustment.
Figure 8B:
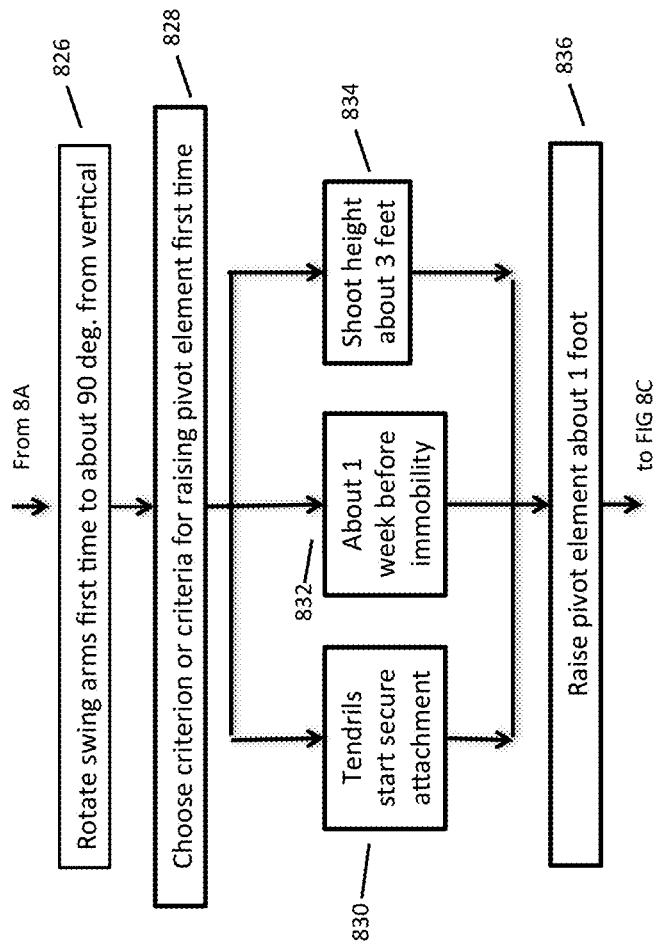
Figure 8C:
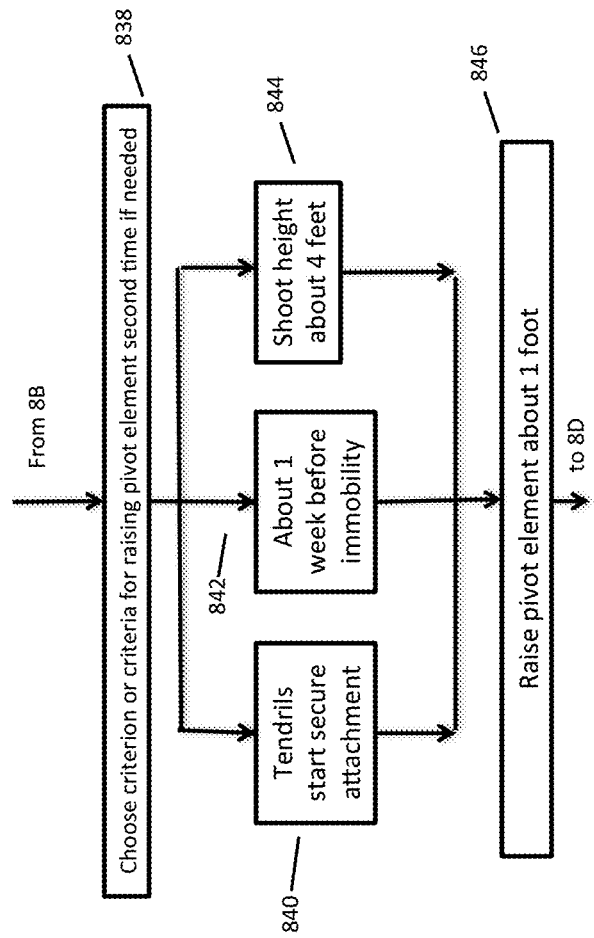
Figure 8D:
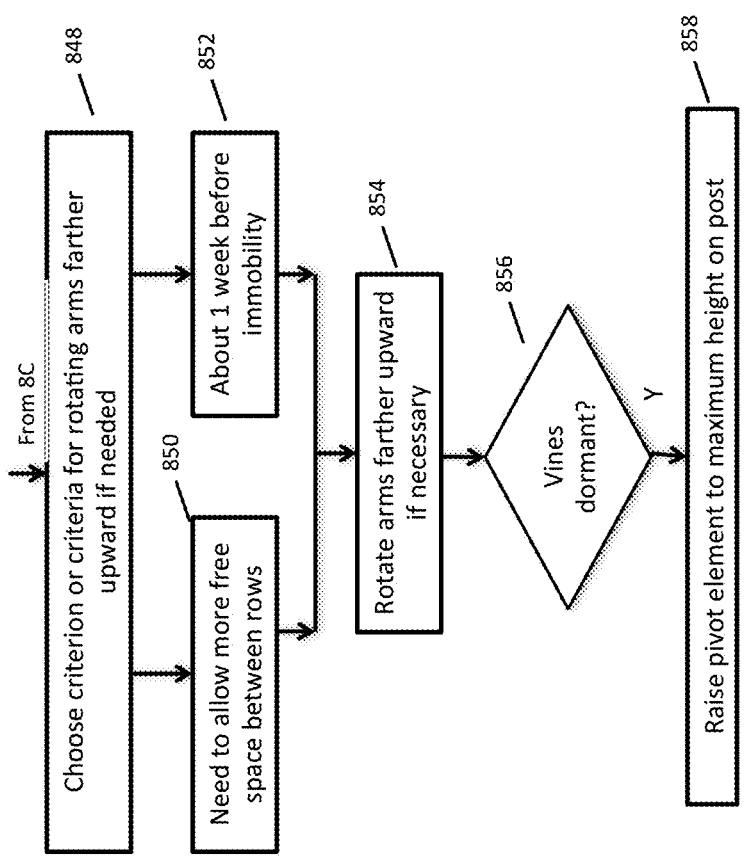

According to step 826 of FIG. 8B, when any criterion or any combination of criterion listed are reached, it is time to rotate the swing arms to about 90 degrees from vertical (such as shown in FIG. 14A, 20B, or 21B).

Step 828 offers three criteria that determine the optimal timing of pivot element (and hence swing arm) vertical adjustment. They are used to indicate when it is time to raise the pivot element, and hence the attached swing arms, to accommodate shoot growth.

Step 830 shows that tendril attachment is a factor to consider because allowing too much tendril attachment will either immobilize the swing arms or inflict excessive damage to the tendrils and subsequently the shoots when the swing arms are lifted.

Step 832 relates that approaching immobility due to tendril attachment and or foliage density is an indicator to raise the grid.

Although the experienced eye can judge when the tendril attachment and or foliage density will soon cause swing arm mobility, a more specific criterion of shoot length is provided for the general grower in step 834. The formula is as follows: The first lift of the grid occurs before bloom and after the shoots have grown to reach a minimum average length of about 3 feet.

Step 836 shows that when any one or more of the criteria is reached, the pivot element and attached swing arms should be raised about 1 foot to keep up with shoot growth. Examples of vertical lift are illustrated in FIGS. 3C-3D and FIGS. 4C-4D.

Step 838 teaches that the pivot element and attached swing arms are in a new position, the same logic is used to determine the timing of the next lift of the pivot element, if needed. Often just one vertical adjustment proves satisfactory, in which case 838 leads to step 848 in FIG. 8D. But if a further adjustment is used, steps 838-846 follow the same sequence as steps 828-836, except that the second lift adjustment, when used, can be determined by when the shoot height is about 4 feet, as indicated in step 844, and the pivot element and attached swing arms are raised by about another foot in step 846.

Step 848 addresses choosing the criterion or criteria for rotating arms farther upward if needed. Often there is benefit to rotating the swing arms upward more than about 90 degrees at some point in the shoot growth cycle. This is shown in FIGS. 2C, 3C, and 4C.

Step 850 explains that one of the benefits of rotating swing arms farther upward is to provide more space between rows when needed for wide machinery. Upward rotation beyond horizontal brings the arms closer together and thus confines the canopy to a smaller width if need or desired. The canopy can be widened again later by bringing the swing arms to a more horizontal position.

In step 852, if the arms do need to by rotated farther upward, it is necessary to do so by one week before immobility.

Step 854 shows the swing arms should be rotated farther upward than horizontal if it proves to be necessary or desirable.

Step 856 asks if the vines are dormant, that is, if the growing season has ended. If so, then lift the pivot element to the maximum height on the post. Raising the pivot element also raises the attached swing arms. The timing can be anywhere after harvest and before pruning for the next season.

The height and rotation formulas stated above are guides to be tempered with the ongoing field observations of shoot length, tendril attachment, and foliage density.

It should be kept in mind that there is no necessary order in the example sequence. The sequence of adjustments shown in the example is: 1st rotation, 1st lift, 2nd lift, and 2nd rotation. In some vineyard rows it may be necessary to use only a 1st rotation and 1st lift, whereas in others all four adjustments may be desirable. The order of operations can also be flexible so that for instance in some circumstances a lift before a rotation may be desirable. The swing arm is a tool that allows the grape grower to have considerable control over canopy training, shading, and shape.

In addition to the method illustrated in FIGS. 8A-8D and flow chart 800, there are other useful operations with swing arms that help train shoots. One is the trailing wire illustrated in FIG. 6A, shown in capture position. FIG. 6A is an end view of one embodiment of the swing arm apparatus, and the trailing wire parallels the fruiting wire. The trailing wire is attached to the distal end of the swing arm by a connector. Although not shown, a trailing wire is connected to the distal end of both swing arms. The purpose of the trailing wire is to catch any stray shoots that may not have been captured during the capture phase (step 814), especially when the particular swing arms used do not have a concavity. FIG. 6B shows the final position of the trailing catch wire after the arms have been rotated upward beyond horizontal.

It should also be noted that the two swing arms are capable of independent rotational operation if desired. For example, the canopy width requirements may be different on the two sides of a row.

This completes the VLSP positioning sequence for the first exampled embodiment.

Other Embodiments

From the foregoing description, it can be seen that the present invention comprises a method, apparatus, and system for using an adjustable grid to train vines and vine shoots. It will be appreciated by those skilled in the art that changes could be made to the embodiments described above without departing from the broad inventive concepts thereof. It is understood, therefore, that this invention is not limited to the particular embodiments described but it is intended to cover all modifications which are within the scope and spirit of the invention as described by the appended embodiments.

I claim:

1. An apparatus for training shoots, comprising:
a post;
a fruiting wire supported by said post;
a cordon or cane attached to said fruiting wire, the cordon or cane generating said shoots during growing season;
a pivot element supported by said post;
a grid comprising longitudinal and transverse elements, said grid sized and configured to substantially capture and separate individual said shoots, and said grid having a length to width ratio of at least 9 to 1;
at least one arm configured to support and retain said grid, said arm configured to rotatively attach to said pivot element.

2. An apparatus for training vegetative shoots, comprising:
a post;
a fruiting wire supported by said post;
a cordon or cane attached to said fruiting wire, the cordon or cane generating said shoots during growing season;
a pivot element supported by said post;
a pair of opposing, rotating arms that rotate about, are supported by, and share said pivot element in common;
at least one grid attached to said arms, said at least one grid comprising longitudinal and transverse elements, said grid with a length to width ratio of at least 9 to 1, said grid sized and configured to substantially capture and separate individual vegetative shoots.

3. The apparatus of claim 2 wherein said pivot element is a support wire, cable, rope, nail, screw, pin, shaft, or fiber.

4. The apparatus of claim 2 further comprising a plurality of fasteners on said post whereby the height of said pivot element is adjusted thereby enabling said swing arm and attached said at least one grid to change vertical position.

5. The apparatus of claim 2 wherein said swing arms mate concentrically, one arm rotating on an inner shaft which slides and rotates within a concentric outer shaft.

6. The apparatus of claim 2 further comprising an elongated connector suspended from the distal end of at least one of said arms, and attached at the other end to a catch wire, whereby the effective length of said arm is extended and late growing shoots are caught.

7. The apparatus of claim 2 further comprising at least one connecting element that attaches to both arms and locks said arms in a fixed angular position with respect to each other.

8. The apparatus of claim 2 further comprising a spring-loaded hook at the pivot end of said swing arm that attaches said swing arm to said pivot element whereby said swing arm is snapped onto said pivot element.

9. The apparatus of claim 2 further comprising alignment holes in said arms, said alignment holes parallel to said pivot element whereby by insertion of a pin through the alignment holes of both of said arms, said arms are locked in fixed angular position with respect to each other.

10. The apparatus of claim 2 wherein said swing arms have notches, slots, or grooves on their surfaces, said notches, slots, or grooves configured to securely hold said grid to said arms.

11. The apparatus of claim 2 further comprising:
  a. a barrel at the pivot end of each arm; and
  b. teeth-like knuckles on said barrel, said knuckles having an in-line cavity with diameter sufficiently large to contain said pivot element, whereby said knuckles intercalate on said pivot element.

12. The apparatus of claim 11 further comprising an entry slot through the knuckles of said barrel for transverse engagement and disengagement with said pivot element.

13. The apparatus of claim 12 wherein the angular orientation of said entry slots in said arms is such as to retain said arms on said pivot element for angles between said arms that occur during normal operation, and to free said arms from said pivot element at the unique angle between said arms in which said entry slots are in alignment, thereby enabling said arms to be attached and removed from said pivot element when the entry slots of said arms are aligned.

14. The apparatus of claim 2 wherein said pivot element is a support wire between said posts.

15. The apparatus of claim 2 wherein said arms are slidingly mobile on said support wire.

16. The apparatus of claim 2 wherein said arms have a capture position in which the arms and attached grids are in proximity to and substantially enclose the fruiting wire, the attached cordon or cane, and shoots thereof.

17. The apparatus of claim 16 wherein said arms have concave portions that face each other in said capture position.

18. The apparatus of claim 16 wherein a portion of said arms at the pivot end are flat and substantially touching in said capture position whereby said flat portion of said arms impede shoots from growing through said grid.

19. The apparatus of claim 16 wherein the distal end of said arms are locked together by magnetic attraction, forced fit, or by hooks.

20. An apparatus for training vegetative shoots in a canopy, comprising:
  a post;
  a fruiting wire supported by said post;
  a cordon or cane attached to said fruiting wire, the cordon or cane generating said shoots during growing season;
  a pivot element supported by said post;
  a pair of opposing, rotating arms that rotate about and are supported by said pivot element, said arms substantially surrounding said fruiting wire when the distal ends of said arms are rotated into proximity to each other;
  a grid comprising a plurality of longitudinal wires attached to each arm, said plurality of longitudinal wires on each arm positioned parallel to said fruiting wire, said plurality of longitudinal wires on each arm being transversely moveable, and a plurality of transverse wires;
  whereby said longitudinal wires function as transversely adjustable longitudinal elements of said grid.

21. The apparatus of claim 20 wherein said grid is sized and configured to substantially capture and separate individual said shoots in the spaces created by the intersections of said longitudinal and transverse wires, and retain and train said shoots as said arms are rotated apart and raised through the growing season.

* * * * *